US009652672B2

(12) United States Patent
Stojancic et al.

(10) Patent No.: US 9,652,672 B2
(45) Date of Patent: May 16, 2017

(54) DIGITAL VIDEO CONTENT FINGERPRINTING BASED ON SCALE INVARIANT INTEREST REGION DETECTION WITH AN ARRAY OF ANISOTROPIC FILTERS

(71) Applicant: Gracenote, Inc., Emeryville, CA (US)

(72) Inventors: Mihailo M. Stojancic, San Jose, CA (US); Prashant Ramanathan, Mountain View, CA (US); Peter Wendt, San Jose, CA (US); Jose Pio Pereira, Cupertino, CA (US)

(73) Assignee: GRACENOTE, INC., Emeryville, CA (US)

( * ) Notice: Subject to any disclaimer, the term of this patent is extended or adjusted under 35 U.S.C. 154(b) by 0 days.

(21) Appl. No.: 15/186,901

(22) Filed: Jun. 20, 2016

(65) Prior Publication Data

US 2016/0307037 A1 Oct. 20, 2016

Related U.S. Application Data

(62) Division of application No. 14/298,261, filed on Jun. 6, 2014, now Pat. No. 9,396,393, which is a division
(Continued)

(51) Int. Cl.
*G06K 9/00* (2006.01)
*G06K 9/46* (2006.01)
(Continued)

(52) U.S. Cl.
CPC ... *G06K 9/00503* (2013.01); *G06F 17/30799* (2013.01); *G06F 17/30805* (2013.01);
(Continued)

(58) Field of Classification Search
CPC ....... G06K 9/00711; G06K 9/00744–9/00751; H04N 21/44008; H04H 60/59; G06F 17/30799–17/30814
See application file for complete search history.

(56) References Cited

U.S. PATENT DOCUMENTS 6,292,193 B1 * 9/2001 Perry .................... G06T 15/04
345/428
6,892,193 B2 5/2005 Bolle et al.
(Continued)

OTHER PUBLICATIONS

Agrawal, M., et al, "CenSurE: Center Surround Extremas for Realtime Feature Detection and Matching", "ECCV 2008, Part IV, LNCS 5305", 2008, pp. 102-115, Publisher: Springer-Verlag Berlin Heidelberg.
(Continued)

*Primary Examiner* — Aaron W Carter
(74) *Attorney, Agent, or Firm* — Hulquist, PLLC; Peter H. Priest

(57) ABSTRACT

Video sequence processing is described with various filtering rules applied to extract dominant features for content based video sequence identification. Active regions are determined in video frames of a video sequence. Video frames are selected in response to temporal statistical characteristics of the determined active regions. A two pass analysis is used to detect a set of initial interest points and interest regions in the selected video frames to reduce the effective area of images that are refined by complex filters that provide accurate region characterizations resistant to image distortion for identification of the video frames in the video sequence. Extracted features and descriptors are robust with respect to image scaling, aspect ratio change, rotation, camera viewpoint change, illumination and contrast change, video compression/decompression artifacts and noise. Compact, representative signatures are generated
(Continued)

for video sequences to provide effective query video matching and retrieval in a large video database.

20 Claims, 15 Drawing Sheets

Related U.S. Application Data of application No. 13/455,560, filed on Apr. 25, 2012, now Pat. No. 8,781,245, which is a division of application No. 12/612,729, filed on Nov. 5, 2009, now Pat. No. 8,189,945.

(60) Provisional application No. 61/181,521, filed on May 27, 2009.

(51) Int. Cl.
*G06F 17/30* (2006.01)
*H04N 5/14* (2006.01)

(52) U.S. Cl.
CPC ..... *G06F 17/30814* (2013.01); *G06K 9/0053* (2013.01); *G06K 9/00744* (2013.01); *G06K 9/4676* (2013.01); *H04N 5/14* (2013.01)

(56) References Cited

U.S. PATENT DOCUMENTS

| | | | |
|---|---|---|---|
| 7,038,185 B1* | 5/2006 | Tumblin | H04N 5/2355 250/208.1 |
| 7,274,801 B2* | 9/2007 | Lee | G06K 9/3241 348/169 |
| 7,529,422 B2 | 5/2009 | Wang et al. | |
| 7,660,481 B2 | 2/2010 | Schaap et al. | |
| 7,903,880 B2 | 3/2011 | Wyatt et al. | |
| 8,171,030 B2 | 5/2012 | Pereira et al. | |
| 8,189,945 B2 | 5/2012 | Stojancic et al. | |
| 8,195,689 B2 | 6/2012 | Ramanathan et al. | |
| 8,229,227 B2 | 7/2012 | Stojancic et al. | |
| 8,335,786 B2 | 12/2012 | Pereira et al. | |
| 8,655,878 B1 | 2/2014 | Kulkarni et al. | |
| 8,666,152 B1 | 3/2014 | Ramanathan et al. | |
| 8,781,245 B2 | 7/2014 | Stojancic et al. | |
| 8,965,863 B1 | 2/2015 | Kulkarni et al. | |
| 9,058,355 B1 | 6/2015 | Kulkarni et al. | |
| 2002/0018594 A1 | 2/2002 | Xu et al. | |
| 2004/0234158 A1 | 11/2004 | Ghosh et al. | |
| 2005/0013486 A1 | 1/2005 | Wiedemann et al. | |
| 2006/0034539 A1 | 2/2006 | Nachlieli et al. | |
| 2007/0183684 A1* | 8/2007 | Bhattacharjya | G06T 5/008 382/274 |
| 2008/0013852 A1 | 1/2008 | Ghosh et al. | |
| 2008/0273777 A1 | 11/2008 | Luboz et al. | |
| 2008/0292194 A1 | 11/2008 | Schmidt et al. | |
| 2008/0310731 A1 | 12/2008 | Stojancic et al. | |
| 2008/0313140 A1 | 12/2008 | Pereira et al. | |
| 2008/0317278 A1 | 12/2008 | Lefebvre et al. | |
| 2009/0010539 A1* | 1/2009 | Guarnera | G06T 3/403 382/167 |
| 2009/0238460 A1 | 9/2009 | Funayama et al. | |
| 2009/0317014 A1* | 12/2009 | Porikli | G06T 5/20 382/261 |
| 2009/0317015 A1* | 12/2009 | Porikli | G06T 5/20 382/261 |
| 2009/0324087 A1* | 12/2009 | Kletter | G06K 9/4671 382/195 |
| 2010/0007797 A1 | 1/2010 | Stojancic | |
| 2010/0049711 A1 | 2/2010 | Singh et al. | |
| 2010/0303338 A1 | 12/2010 | Stojancic et al. | |
| 2010/0318515 A1 | 12/2010 | Ramanathan et al. | |
| 2010/0325117 A1 | 12/2010 | Sharma | |
| 2012/0051642 A1 | 3/2012 | Berrani et al. | |
| 2012/0108973 A1 | 5/2012 | Osumi | |
| 2012/0207402 A1 | 8/2012 | Stojancic et al. | |
| 2012/0215789 A1 | 8/2012 | Ramanathan et al. | |
| 2013/0179452 A1 | 7/2013 | Ramanathan et al. | |
| 2014/0052737 A1 | 2/2014 | Ramanathan et al. | |

OTHER PUBLICATIONS

Bay, H., et al, "SURF: Speeded Up Robust Features", "Computer Visionn and Image Understanding", 2008, pp. 346-359, vol. 110, No. 3.

Grabner, M., et al, "Fast approximated SIFT", "Asian Conference on Computer Vision, Hyderabad, India, Springer, LNCS 3851", 2006, pp. 918-927.

Heckbert, P., et al, "Filtering by Repeated Integration", "Proceedings of SIGGRAPH '86, Dallas", Aug. 1986, pp. 317-321.

Hussein, M., et al, "Kernel Integral Images: A Framework for Fast Non-Uniform Filtering", "IEEE Computer Society conference on Computer Vision and Pattern Recognition", Jul. 2008, pp. 1-10.

Lindeberg, T., "Scale-Space for Discrete Signals", "IEEE Transactions on Pattern Analysis and Machine Intelligence", Mar. 1990, pp. 234-254, vol. 12, No. 3.

Lowe, D., "Distinctive Image Features from Scale-Invariant Keypoints", "International Journal of Computer Vision", Jan. 5, 2004, pp. 91-110, vol. 60, No. 2.

Mikolajczyk, K., et al., "Indexing Based on Scale Invariant Interest Points", "International Conference on Computer Vision", Jul. 2001, pp. 525-531, vol. 1.

Mikolajczyk, K., et al., "An Affine Invariant Interest Point Detector", "European Conference on Computer Vision", 2002, pp. 128-142, vol. 1.

Mikolajczyk, K., et al., "Scale & Affine Invariant Interest Point Detectors", "International Journal of Computer Vision", 2004, pp. 63-86, vol. 60, No. 1.

Mikolajczyk, K., et al., "A Performance Evaluation of Local Descriptors", "IEEE Transactions on Pattern Analysis and Machine Intelligence", Oct. 2005, pp. 1615-1630, vol. 27, No. 10.

* cited by examiner

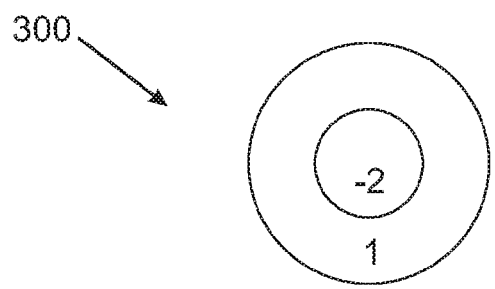
BI-LEVEL APPROXIMATION OF THE
LAPLACIAN OF GAUSSIAN
SECOND ORDER DERIVATIVE FILTER
FIG. 3
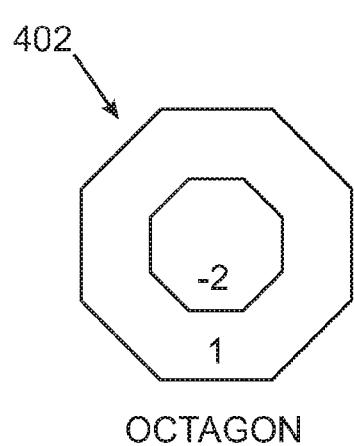
OCTAGON
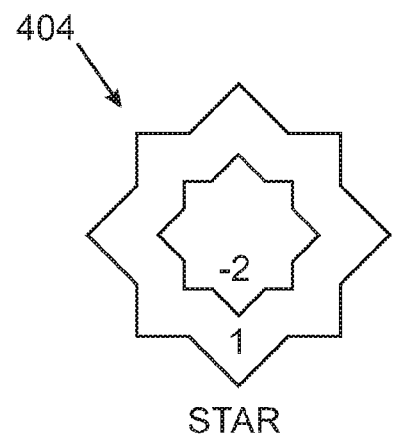
STAR
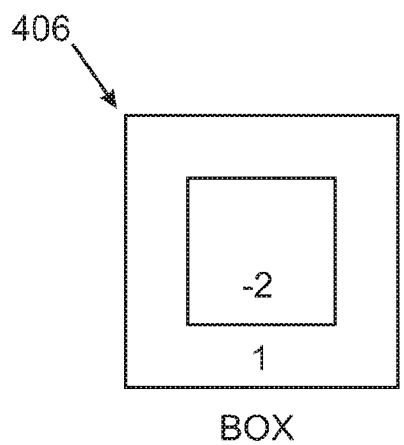
BOX
FIG. 4

LAPLACIAN OF GAUSSIAN RESPONSE IMAGES
FOR 5 SCALES ($S_0, S_1, S_2, S_3, S_4$)
EXAMPLE OF 45 PIXEL 3-DIMENSIONAL
SCALE-SPACE NEIGHBORHOOD SHOWN

SOME EXAMPLES OF ANISOTROPIC SAMPLED
GAUSSIAN SECOND ORDER DERIVATIVE FILTERS

EXAMPLES OF FINITE SPATIAL SUPPORT
ANISOTROPIC SAMPLED GAUSSIAN SECOND
ORDER PARTIAL DERIVATIVE FILTERS IN y-DIRECTION

EXAMPLES OF FINITE SPATIAL SUPPORT ANISOTROPIC SAMPLED GAUSSIAN SECOND ORDER PARTIAL DERIVATIVE FILTERS IN xy-DIRECTION

EXAMPLE OF AN ARRAY OF 25 ANISOTROPIC
ELLIPTIC-SHAPED SAMPLED FILTERS
(NOT TO SCALE); THE FILTERS
ALONG THE DIAGONAL ARE ISOTROPIC

EXAMPLE OF AN ARRAY OF 25 FINITE
SPATIAL SUPPORT ANISOTROPIC RECTANGULAR
SAMPLED FILTERS (NOT TO SCALE)

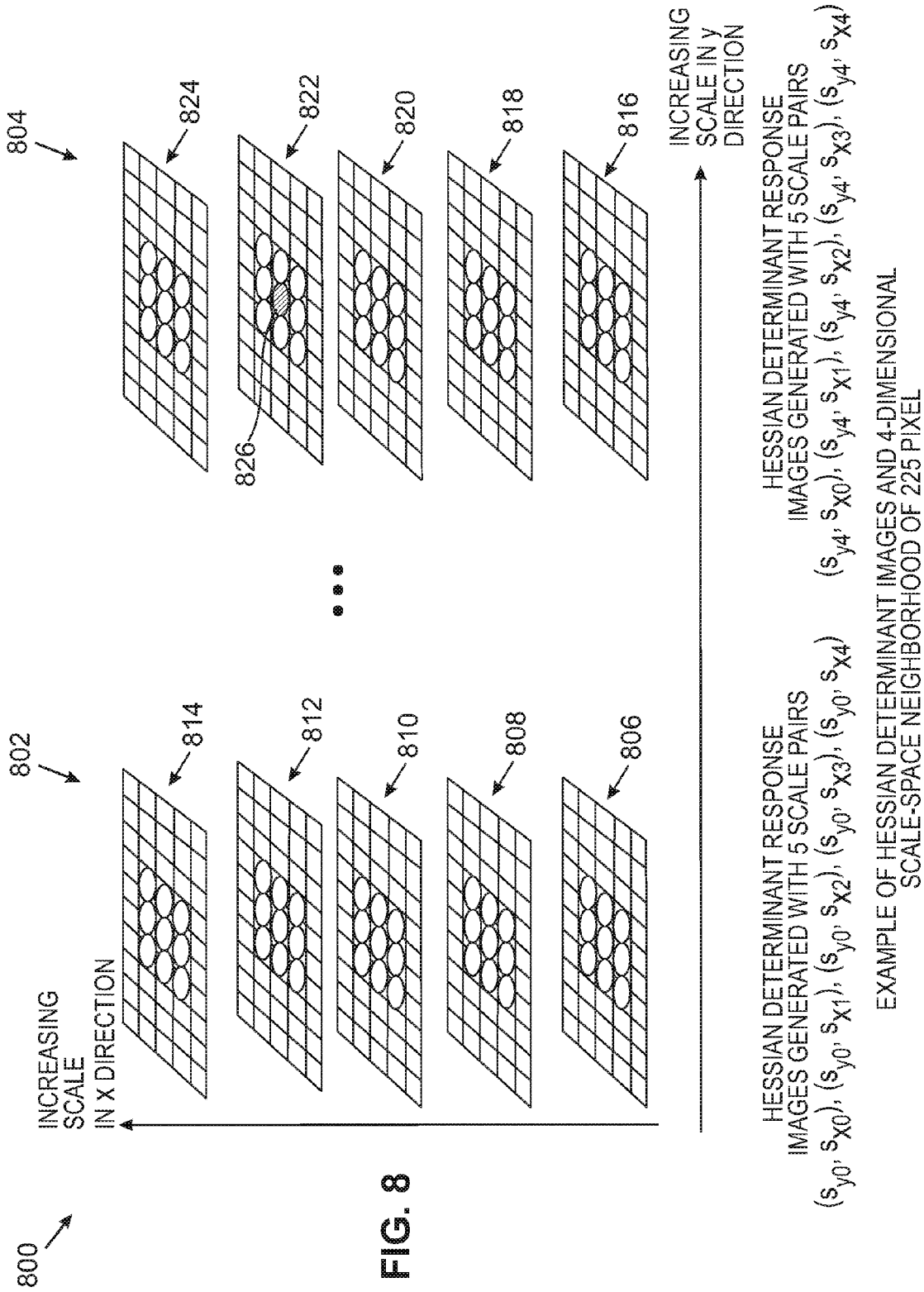

DIGITAL VIDEO CONTENT FINGERPRINTING BASED ON SCALE INVARIANT INTEREST REGION DETECTION WITH AN ARRAY OF ANISOTROPIC FILTERS

This application is a divisional of U.S. patent application Ser. No. 14/298,261 filed on Jun. 6, 2014 which is a divisional of U.S. patent application Ser. No. 13/455,560 filed on Apr. 25, 2012 issued as U.S. Pat. No. 8,781,245 which is a divisional of U.S. patent application Ser. No. 12/612,729 filed on Nov. 5, 2009 issued as U.S. Pat. No. 8,189,945 which claims the benefit of U.S. Provisional Patent Application Ser. No. 61/181,521 entitled "Content Based Digital Video Fingerprinting Based on Scale Invariant Interest Region Detection with an Array of Anisotropic Filters" filed on May 27, 2009 which are hereby incorporated by reference in their entirety.

CROSS REFERENCE TO RELATED APPLICATION

The patent applications entitled "Methods and Apparatus for Providing a Scalable Identification of Digital Video Sequences" U.S. application Ser. No. 12/141,163 filed on Jun. 18, 2008 and issued as U.S. Pat. No. 8,229,227, "Method and Apparatus for Multi-dimensional Content Search and Video Identification", U.S. application Ser. No. 12/141,337, filed on Jun. 18, 2008 and issued as U.S. Pat. No. 8,171,030, and "Digital Video Fingerprinting Based on Resultant Weighted Gradient Orientation Computation", U.S. application Ser. No. 12/491,896 filed on Jun. 25, 2009 and issued as U.S. Pat. No. 8,385,644, have the same assignee as the present application, are related applications, and are hereby incorporated by reference in their entirety.

FIELD OF THE INVENTION

The present invention relates generally to improvements in video processing architectures and methods for feature extraction from a digital video sequence. More particularly, the present invention addresses methods and apparatuses for video sequence structuring, subsequent video frame feature extraction, and efficient signature generation for large video database indexing and search.

GENERAL BACKGROUND OF THE INVENTION

Video applications which include video database management, video database browsing and video identification are undergoing explosive growth and are expected to continue to grow. To address this growth, there is a need for a comprehensive solution related to the problem of indexing of a video sequence database and the identification of a particular video sequence or sequences within that database. Major applications include large video database mining and identifying similar videos for purposes, such as, copyright protection, advertising and surveillance. Due to the large size of such databases and the density of video files, high performance, accurate video identification and search technologies are needed. Furthermore, robust video content identification, management, and copyright protection must be resistant to intentional or unintentional video content change or distortion within the limits of parameters, such as, reasonable view-ability. The overall design should be scalable to efficiently handle very large databases of videos and an arbitrary length of a query sequence.

Increasing demand for such solutions, which include standard definition (SD) and high definition (HD) formats of video, requires increasing sophistication, flexibility, and performance in the supporting algorithms and hardware. The sophistication, flexibility, and performance that are desired exceed the capabilities of current generations of software based solutions, in many cases, by an order of magnitude.

SUMMARY OF THE INVENTION

In one or more of its several aspects, the present invention recognizes and addresses problems such as those described above. To such ends, an embodiment of the invention addresses a method for content based video sequence identification. Active regions are determined in video frames of a video sequence. Video frames are selected in response to temporal statistical characteristics of the determined active regions. A two pass analysis is used to detect a set of initial interest points and interest regions in the selected video frames to reduce the effective area of images that are refined by complex filters that provide accurate region characterizations resistant to image distortion for identification of the video frames in the video sequence.

Another embodiment of the invention addresses a method for interest point descriptor and signature generation. Refined interest point parameter vectors are generated, wherein each vector contains a set ($s_x$, $s_y$, x, y, peak polarity). A rectangular box is drawn encompassing $Ns_x \times Ms_y$ pixels and centered at an interest point (x, y) location associated with a set ($s_x$, $s_y$, x, y, peak polarity). A multi-dimensional descriptor and a multi-dimensional signature are determined based on pixels in the rectangular box.

Another embodiment of the invention addresses a method of applying an array of anisotropic filters for image scale-space analysis. An array of elliptic-shaped, sampled anisotropic second order partial derivative Gaussian filters with ($s_x$, $s_y$) scale parameters is formed. An array of rectangular-shaped, sampled anisotropic second order partial derivative Gaussian filters with finite spatial support with ($s_x$, $s_y$) scale parameters is formed to approximate the elliptic-shaped sampled anisotropic second order partial derivative Gaussian filters. A scale space for a selected frame is analyzed by the array of rectangular sampled anisotropic second order partial derivative Gaussian filters of finite spatial support corresponding to different ($s_x$, $s_y$) scales. A region of pixels in a surrounding neighborhood of an initial interest point is convolved with the array of rectangular sampled anisotropic second order partial derivative Gaussian filters to produce a result that is resistant to image distortion.

A further embodiment of the invention addresses a computer readable medium storing a computer program which causes a computer system to perform a method of applying an array of anisotropic filters for image scale-space analysis. An array of elliptic-shaped, sampled anisotropic second order partial derivative Gaussian filters with ($s_x$, $s_y$) scale parameters is formed. An array of rectangular-shaped, sampled anisotropic second order partial derivative Gaussian filters with finite spatial support with ($s_x$, $s_y$) scale parameters is formed to approximate the elliptic-shaped sampled anisotropic second order partial derivative Gaussian filters. A scale space for a selected frame is analyzed by the array of rectangular sampled anisotropic second order partial derivative Gaussian filters of finite spatial support corresponding to different ($s_x$, $s_y$) scales. A region of pixels in a surrounding neighborhood of an initial interest point is convolved with the array of rectangular sampled anisotropic second order partial derivative Gaussian filters to produce a result that is resistant to image distortion.

These and other features, aspects, techniques and advantages of the present invention will be apparent to those skilled in the art from the following detailed description, taken together with the accompanying drawings and claims.

BRIEF DESCRIPTION OF THE DRAWINGS

FIG. 3 illustrates bi-level approximation of the Laplacian of Gaussian second order partial derivative filter with a circular shape;

FIG. 4 illustrates a set of bi-level filters with various geometries, further simplifying a circularly shaped bi-level approximation of the Laplacian of Gaussian second order partial derivative filter in accordance with an embodiment of the present invention;

FIG. 8 illustrates the determinant of Hessian matrix response images and a local maximum computed in 4-dimensional volume constructed with 3×3 spatial neighborhood at 25 $(s_x, s_y)$ scales in accordance with an embodiment of the present invention;

DETAILED DESCRIPTION

The present invention will now be described more fully with reference to the accompanying drawings, in which several embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

It will be appreciated that the present disclosure may be embodied as methods, systems, or computer program products. Accordingly, the present inventive concepts disclosed herein may take the form of a hardware embodiment, a software embodiment or an embodiment combining software and hardware aspects. Furthermore, the present inventive concepts disclosed herein may take the form of a computer program product on a computer-readable storage medium having computer-usable program code embodied in the medium. Any suitable computer readable medium may be utilized including hard disks, CD-ROMs, optical storage devices, flash memories, or magnetic storage devices.

Computer program code or software programs that are operated upon or for carrying out operations according to the teachings of the invention may be written in a high level programming language such as C, C++, JAVA®, Smalltalk, JavaScript®, Visual Basic®, TSQL, Perl, use of .NET™ Framework, Visual Studio® or in various other programming languages. Software programs may also be written directly in a native assembler language for a target processor. A native assembler program uses instruction mnemonic representations of machine level binary instructions. Program code or computer readable medium as used herein refers to code whose format is understandable by a processor. Software embodiments of the disclosure do not depend upon their implementation with a particular programming language.

The methods described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A computer-readable storage medium may be coupled to the processor through local connections such that the processor can read information from, and write information to, the storage medium or through network connections such that the processor can download information from or upload information to the storage medium. In the alternative, the storage medium may be integral to the processor.

Figure 1:
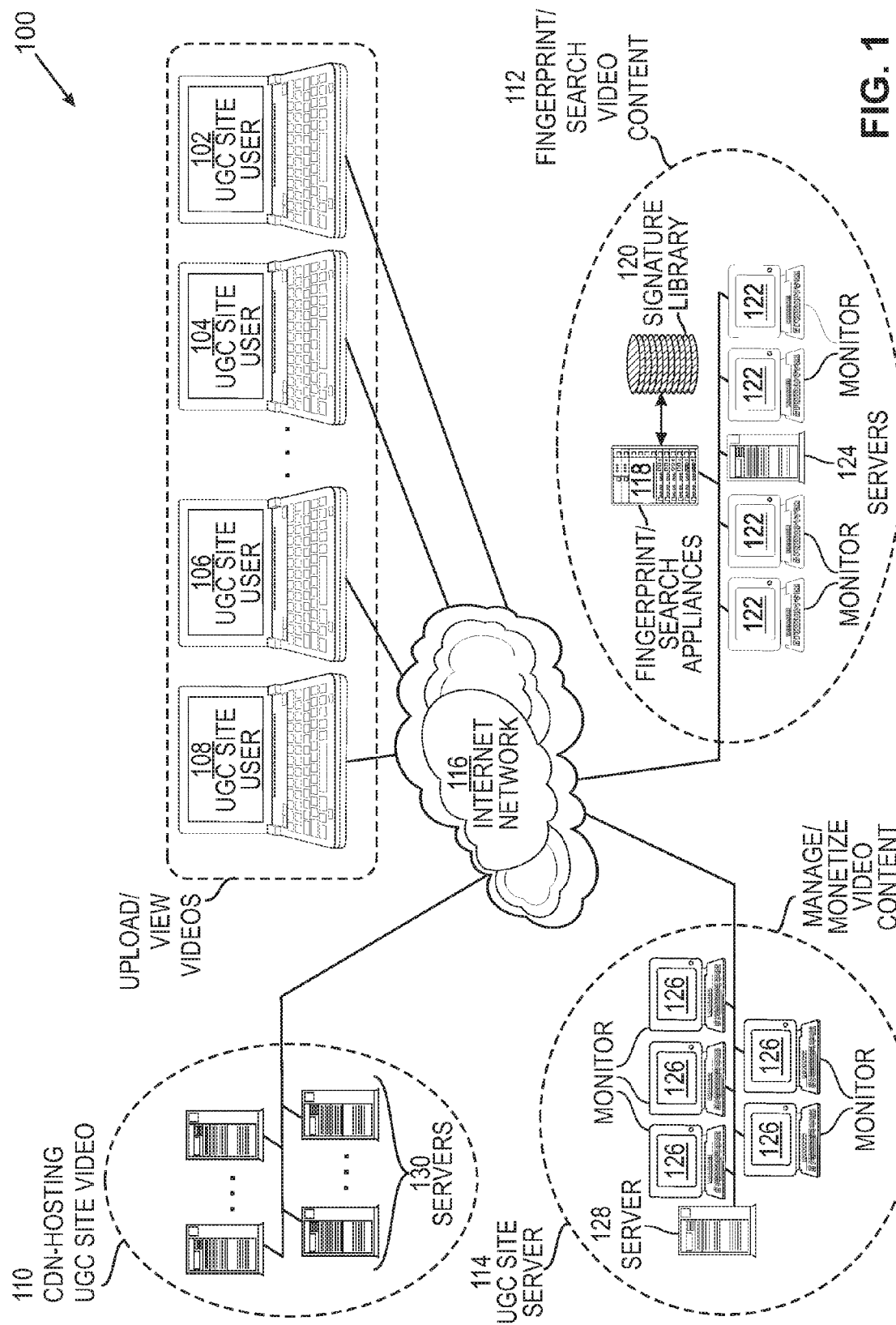
FIG. 1 illustrates an Internet networking system for content based video fingerprinting and identification in accordance with an embodiment of the present invention.

FIG. 1 illustrates a system 100 for both video fingerprinting and identification, and video content based management in accordance with an embodiment of the present invention. As used herein, a video fingerprint is a calculated numerical value, alternatively termed a signature, which represents a prominent feature of a video frame. A collection of signatures drawn from a single video frame with multiple features generates a compact video frame representation, while a collection of signatures associated with each video frame in a video sequence with multiple frames forms the video sequence representation. The approach represented by system 100 targets user generated content (UGC) Internet web sites. User sites 102-108 generate user video content which is uploaded to a UGC Internet web company where it may be stored in a server and storage subsystem 128. Alternatively, the video content may be redirected to a third party server system providing service to the UGC Internet web company. For example, third party server system 110 with an array of servers 130 hosts user generated video content and provides service to the UGC Internet web company with UGC site server system 114, with their servers and storage subsystem 128 and monitors 126. A video fingerprinting and video identification system 112 utilizes a video fingerprinting and search appliance 118, a video database 120 containing a signature library, and servers 124 with user terminal/monitors 122. The Internet network 116 allows for remote system location interconnect, and information exchange and management.

The video fingerprinting and video identification system 112 in FIG. 1 is scalable and utilizes highly accurate video fingerprinting and identification technology that checks unknown video content against a database of previously fingerprinted video content, which is considered an accurate or "golden" database. The video fingerprinting and video identification system 112 is different from commonly deployed systems in that it extracts features from the video itself and does not rely on a hash of a file, metadata or the audio stream that accompanies a video. The video fingerprinting and video identification system 112 allows a UGC site server system 114 to configure a "golden" database specific to its business requirements. A self-contained video fingerprinting and search appliance 118 that is configured to sit on the Internet network 116 within the video fingerprinting and video identification system 112, compares video streams against a database of signatures in the video database 120, that has been previously generated. The video fingerprinting and search appliance 118 allows a UGC site server system 114 to automatically flag multiple copies or reoccurring versions of popular uploads, automatically flag content previously identified for removal, as well as, content identified under a take-down notice, content not appropriate for a site, such as inappropriate, violent, racist, or the like content, and to correlate results from other filtering methods.

Each of the appliances and servers, 118, 124, 128, and 130 may include a processor complex having one or more processors, having internal program storage and local user controls such as a monitor, a keyboard, a mouse, a printer, and may include other input or output devices, such as an external file storage device and communication interfaces. The video fingerprinting and search appliance 118 may store programs such as a program implementation of a content based video identification process of the present invention or have access to such programs through electronic media, such as may be downloaded over the Internet from an external server, accessed through a universal serial bus (USB) port from flash memory, accessed from disk media of various types, or the like.

The video fingerprinting and search appliance 118 has access to the video database 120 which may be accessed by software programs operating from the appliance 118, for example. The video database 120 may store the video archives, as well as all data related to inputs to and outputs from the video fingerprinting and video identification system 112, and a plurality of video fingerprints that have been adapted for use as described herein and in accordance with the present invention. It is noted that depending on the size of an installation, the functions of the video fingerprinting and search appliance 118 and the management of the video database 120 may be combined in a single server running separate program threads for each function.

The video fingerprinting and video identification system 112 may also suitably include one or more servers 124 and user terminals or monitors 122. Each of the user terminals or monitors 122 and the video fingerprinting and search appliance 118 may be connected directly to the server 124 or indirectly connected to it over a network, such as a local cabled intranet, wireless intranet, the Internet, or the like.

The video fingerprinting and search appliance 118 may comprise, for example, a personal computer, a laptop computer, or the like. The user terminals or monitors 122 may comprise a personal computer equipped with programs and interfaces to support data input and output and video fingerprinting and search monitoring that may be implemented both automatically and manually. The user terminals or monitors 122 and video fingerprinting and search appliance 118 may also have access to the server 124, and may be accessed from the server 124.

One of the user terminals or monitors 122 may support a graphical user interface utilized to setup the video fingerprinting parameters and present the search results. These terminals may further provide miscellaneous administrative functions such as user log-on rights, change of user permissions, passwords, and the like.

At the base of the problem of matching a video clip to a video from a large collection of videos, is the problem of reliable matching of two digital images when one of them has undergone an array of geometric and optical distortions. Thus, the problem may be restated as what techniques are required to reliably match a distorted query video frame, chosen from a query video clip, to a corresponding undistorted, original video frame residing in a data base of original video material. Since the data base of original video material may be very large, many video frames in this data base could exhibit substantial statistical similarity. Furthermore, many features within a single video frame may also show statistical similarity in both a visual or optical and algorithmic or geometric sense. This fact makes it difficult to clearly distinguish between many possible feature descriptor matches resulting from a data base browsing or search activity when a non-exact, similarity measure is used. Hence, a precise, discriminative, and robust video frame feature characterization is desirable having a feature detector and identifier that are well localized in both the image space domain and in the image scale domain.

In general, a feature or an interest point detector identifies distinct areas located in a video frame such as blobs, corners, and junctions. For an accurate identification and description of such features a detector is required to maintain persistent identification and localization of similar features across an array of geometric and optical distortions. Furthermore, the cost and performance of accurately extracting video frame features needs to be optimized with respect to a particular application environment and the underlying commercial deployment environment.

A two pass analysis process is described for efficient detection and selection of a preliminary prominent feature or features or region or regions of pixels in a selected video frame in a first pass analysis to be further processed in the second pass analysis. The second pass analysis renders more precisely spatial position of each particular feature and determines precise two dimensional ($s_x$, $s_y$) scale parameters for each feature. The two dimensional scale parameter determination is based on an array of two dimensional anisotropic filters, specially designed to accommodate applied feature detection and description processes. A rectangular region, with horizontal and vertical vertices proportional to the ($s_x$, $s_y$) scale of a feature or interest point, is generated around each interest point. Subsequently, a descriptor or signature or both are generated based on pixel processing in these rectangular interest point regions, and a database is formed to hold signatures which describe the content of the video sequence.

Figure 2:
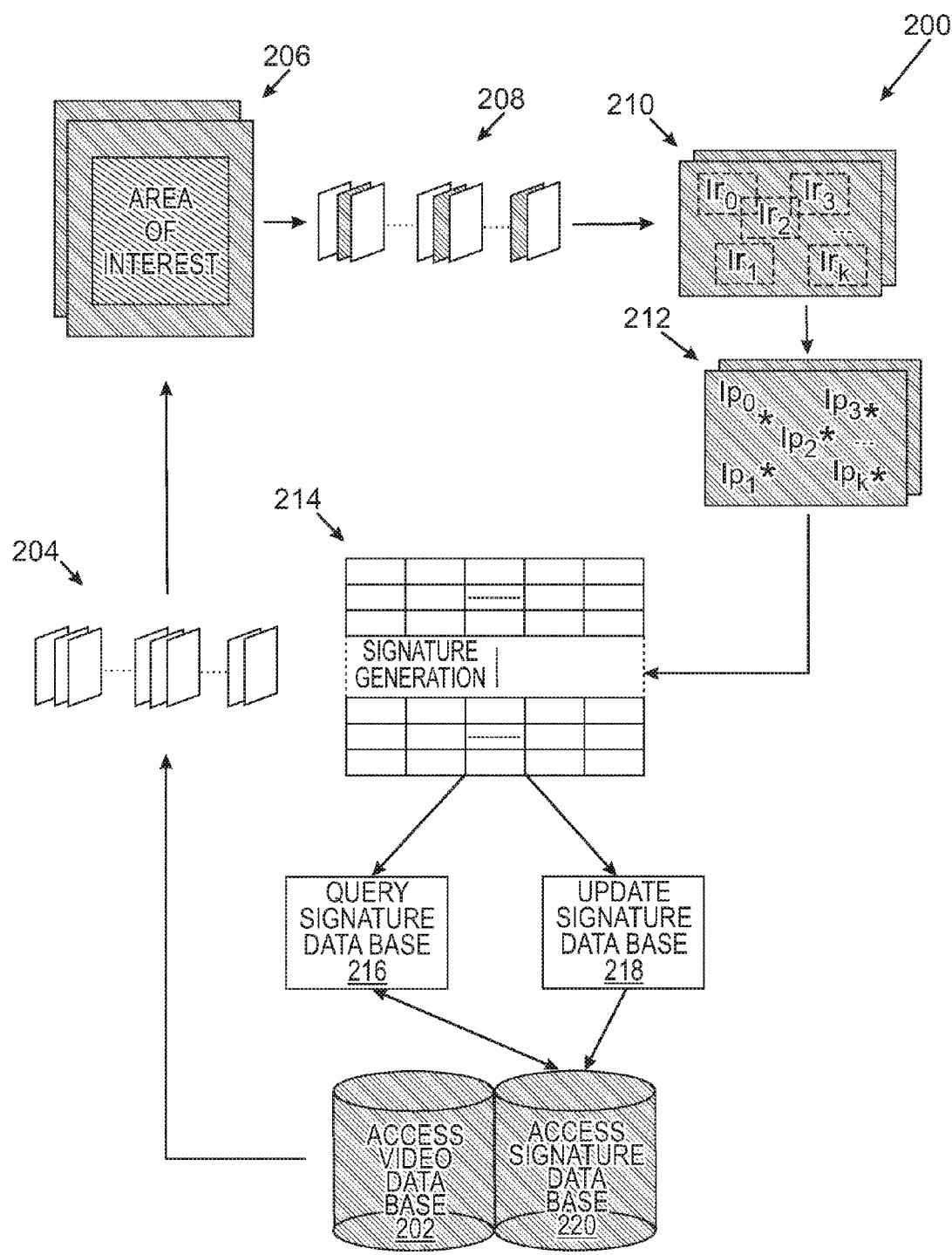
FIG. 2 illustrates a process for content based video feature extraction, signature generation, and database formation and search in accordance with an embodiment of the present invention.

FIG. 2 illustrates a process 200 for content based video feature extraction, signature generation, and database formation and search in accordance with an embodiment of the present invention. For use herein, a video sequence is defined as a plurality of video frames presented sequentially in time. As shown in FIG. 2, the basic functionality of a video sequence signature database formation consists of selecting a video sequence in step 204 from a video database in access step 202, and processing the video sequence in a series of process steps 206, 208, 210, 212, 214, and 218 as follows. An analysis process step 206 includes processing a video sequence by video frame filtering for noise reduction and desired active region determination for each video frame as described in more detail below.

The active region of a video frame is determined in step 206 by examining the video frame's horizontal and vertical boundaries with respect to a total normalized average brightness of the entire video frame, combined with examination of the overall activity of the frame boundaries. The active region determination is based on a three-pass process. During a first pass of the video fame active region determination process, frame boundaries are examined line by line in horizontal and vertical direction to determine preliminary inactive boundary areas. The process is based on comparison of a normalized brightness value computed for each successive line with the overall video frame normalized brightness value. The process advances through successive lines at the frame boundaries in both horizontal and vertical direction, starting from the frame outermost lines, until it reaches a line with a normalized brightness greater than a certain percentage of the overall normalized brightness computed for the entire frame. This step determines four preliminary boundaries for the frame active region. In a second pass, an activity measure is derived for each of the preliminary boundary regions, based on a gradient vector intensity computed for each pixel and a normalized sum of the gradient vector intensities computed for each region. The activity measure for each identified boundary region is compared against an activity threshold and based on this comparison it is decided whether to go into the third step of active region determination, or accept the preliminary active region boundaries determined in the first step. The third step of the active region determination is a repeat of the first step of the boundary region line brightness examination but with adjusted percentage of the normalized average brightness computed for the entire frame used as a threshold parameter for comparison. After the third step, the boundaries of the active region are determined for the frame, and the inactive frame regions are discarded. The process of active region determination is repeated for each frame of a video sequence.

In step 208, temporal statistics are collected for each video sequence, and based on these temporal statistics, a set of video frames is selected for further spatial processing.

First level spatial video frame analysis step 210 includes detection of a set of interest regions based on Laplacian of the Gaussian filtering, as described in connection with flowchart 1200 of FIG. 12.

Second level spatial video frame analysis step 212 is based on a Hessian operator and an array of anisotropic Gaussian filters. As described in connection with flowchart 1300 of FIG. 13, interest point (x, y) position refinement and ($s_x$, $s_y$) scale parameters are computed for the set of interest regions determined in the first level analysis step 210.

A descriptor and signature generation process step 214 derives compact multi-dimensional signatures for K rectangular regions of size ($Ns_x$)×($Ms_y$), where N and M are multipliers of the ($s_x$, $s_y$) scales computed in spatial x and y directions, as described in more detail below with regard to descriptor and signature generation flowchart 1400 of FIG. 14.

An update process step 218 is utilized to insert a set of compact signatures into the signature database in access step 220 to be used for video sequence search and identification.

As the output of the above processing, a number of results are presented including a count of similar videos found, a count of not identified videos, statistics with respect to precise timing of matching video reference frames, and a confidence factor associated with each identified video.

A similar process is followed in a video sequence search and identification process. A compressed or raw video sequence to be identified is provided, for example, from a video database in access step 202 and processed in a series of process steps 204, 206, 208, 210, 212, 214, and 216. The query process 216 includes processing to deliver a set of videos closely matching the original compressed or raw video sequence, as shown in flowchart 1500 of FIG. 15.

Spatial domain video frame processing for interest point or feature detection is described next. Commonly used non-scale invariant interest point detectors use a corner detector or "Harris" detector. A corner detector is based on computing eigenvalues of a second-moment matrix. It is relatively fast and efficient, but it is not scale-invariant. Thus, the generally known corner detector is not suitable for an environment where there is considerable video cropping, stretching and aspect ratio change. More suitable detectors are scale invariant detectors which allow detection of interest points on an array of different resolutions or scales of the same image. A scale, as used herein, is defined as a blurring filter parameter or parameters, for example, a Gaussian filter parameter or parameters which determine the amount of blur used to obtain a lower resolution image or an image on a lower scale. The scale invariant detectors identify blob like structures at progressively growing scales in an image pyramid arrangement.

Two major characteristic functions are used to determine the blob like structures: a "Laplacian" function and a "Hessian" function. Both functions can be directly derived from a Hessian matrix. The Hessian function represents the determinant of the Hessian matrix, while the Laplacian function represents a Hessian matrix trace. The Laplacian function can be efficiently determined without full derivation of the Hessian matrix and is therefore easier to compute. An approximation applied to blob detection is focused on approximating a Laplacian of Gaussian (LoG) function, a trace of the Hessian matrix, by a difference of Gaussians (DoG) filter. Another approach is focused on approximating the LoG function with a set of filters which lend themselves to efficient computation. Hessian based detectors which use the determinant of the Hessian matrix, rather than its trace, are quite stable and repeatable but are slower to compute. However, through experimentation, the Hessian matrix trace, representing a Laplacian function, can be approximated with very fast computational structures. Moreover, a Laplacian function based detector with symmetric Gaussian filters has been determined to be capable of detecting equally well elongated and non-elongated blob like image structures, thus lending its use to initial localization of a limited number of interest regions. In accordance with these findings, an initially localized set of image regions of interest that are computed with a fast Laplacian approximation can be subsequently processed by a more complex, novel anisotropic detector having partial resistance to affine image transformation. Advantageously, this process allows for determining more refined interest point spatial positions and associated two dimensional scales without adversely affecting overall system performance. This advantageous two pass analysis process to feature or interest point detection is described in which more computationally expensive operations are applied only at a small number of initially selected video frame interest regions which pass an initial test of suitability.

First level spatial video frame analysis and interest region determination is described next. On this level, preliminary interest region localization is performed by a comprehensive search for pronounced blob like image structures over all scales and image spatial locations. Search and selection of suitable blob like image structures is based on a normalized maximum of the Laplacian of Gaussian function as in equation (1):

$$\max_\sigma |\sigma^2 (L_{xx}(z,\sigma) + L_{yy}(z,\sigma))|, \quad (1)$$

maximized over a for all image points z=(x, y).

Suitable isotropic Gaussian filters used in equation (1) are given by equation (2):

$$g(x, y, \sigma) = \frac{1}{2\pi\sigma^2} e^{-(x^2+y^2)/2\sigma^2}. \quad (2)$$

The $L_{xx}(z, \sigma)$ and $L_{yy}(z, \sigma)$ represent the convolution of the original image frame with second order partial derivatives of the Gaussian filters in equation (2):

$$L_{xx}(z, \sigma) = \frac{\partial^2 g(z, \sigma)}{\partial^2 x} * I(z) \quad (3)$$

$$L_{yy}(z, \sigma) = \frac{\partial^2 g(z, \sigma)}{\partial^2 y} * I(z)$$

where * denotes the convolution operation, I(z) the image intensity at point z, $\partial/\partial x$, $\partial/\partial y$ the first order partial derivatives, and $\partial^2/\partial x^2$, $\partial^2/\partial y^2$ the second order partial derivatives.

The spatial scales used in equations 1-3, and determined by the symmetric isotropic Gaussian filter σ parameter, are scalars with each spatial scale corresponding to one σ, with no notion of the spatial x, y directions.

The Laplacian of Gaussian function, equation (1), can be approximated with a difference of Gaussian $D(z, \sigma)=(g(z, k\sigma)-g(z, \sigma))*I(z)=L(z, k\sigma)-L(z, \sigma)$, where k is a scalar, and $L(z, \sigma)=(g(z, \sigma))*I(z)$, or more efficiently approximated by using a set of bi-level binary symmetric filters as described below.

Figure 5:
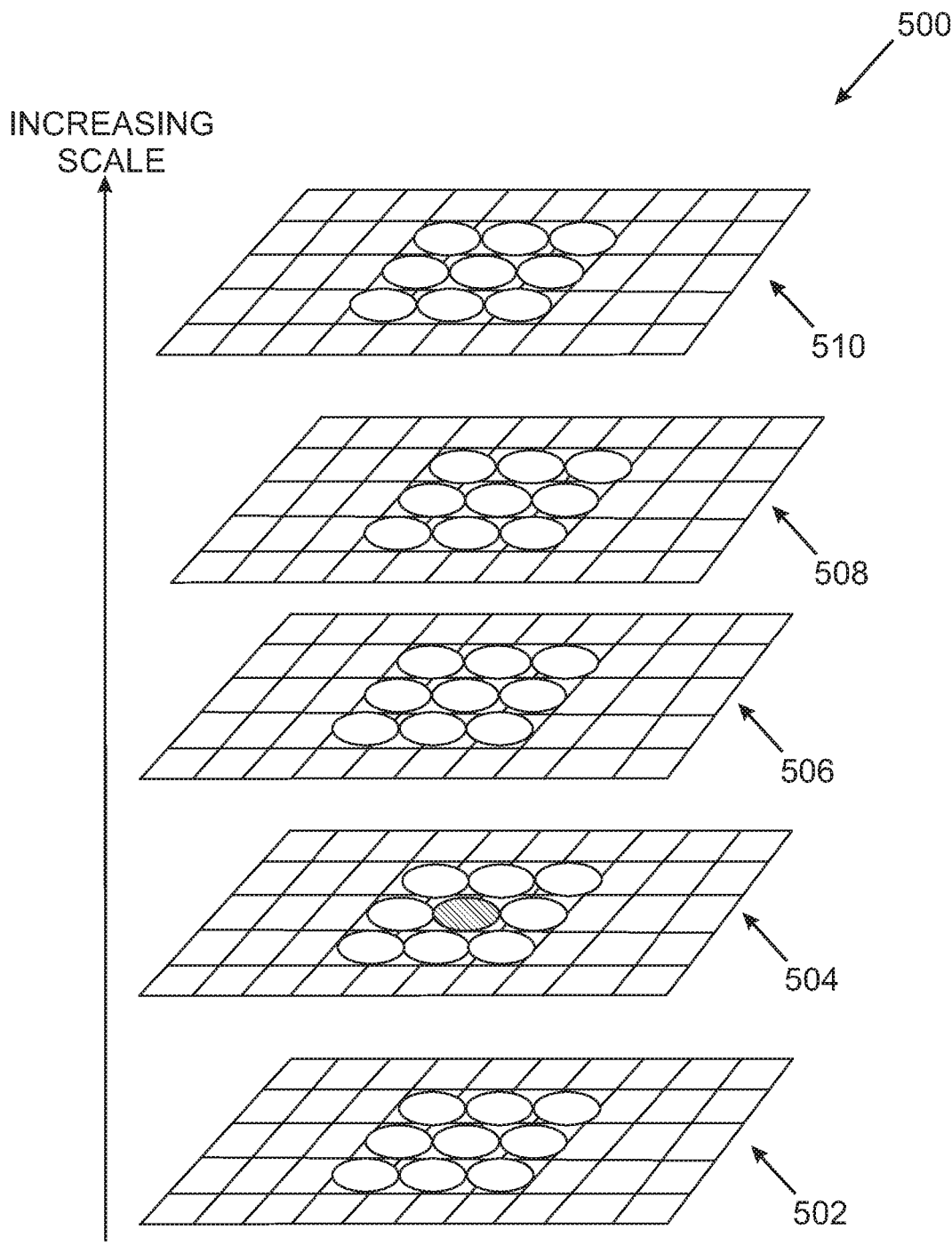
FIG. 5 illustrates a number of image frames generated by applying a set of Laplacian of Gaussian second order partial derivative filters of various scales on a single image, and a 3×3×5 3-dimensional pixel volume used to determine the maximum filter response value at each spatial position in accordance with an embodiment of the present invention.

The second order partial derivative of the Gaussian function in equation (3), can be discretized and further approximated with a simple bi-level, symmetric filter with just two quantization levels. FIG. 3 shows an example of such a bi-level filter with circular symmetry where the function is quantized to −2 on the inner region and 1 on the outer region. FIG. 4 shows an exemplary set of bi-level filters with varying degrees of symmetry approximating the circular filter. While a circular bi-level filter is an accurate bi-level approximation to the second order partial derivative Gaussian filter, it doesn't lend itself to efficient computation. The octagonal filter 402, star filter 404, and box filter 406 multiply image pixels by either 1 or −2 and can be very efficiently computed with integral images. Particularly suitable are the octagonal filter 402 and the star shaped filter 404 since they secure a degree of rotational invariance and can be rapidly computed with integral images in constant time, independent of the filter size. An image, convolved with a bi-level filter, such as one of the filters described above, represents the Laplacian of Gaussian second order partial derivative filter response image and maintains the original image spatial extent, such that the filtered images are not decimated. For each size or scale of a bi-level filter, a response image, as in planes 502, 504, 506, 508, 510 of FIG. 5, is generated representing the desired image scales to be analyzed. Subsequently, in localized image spatial areas, with associated scales as the third dimension, a three dimensional scale space extrema detection is performed according to equation (1).

FIG. 5 shows an example of a volume enclosing 45 pixels, having 9 circled pixels in each plane of FIG. 5, in a combined scale space domain where each plane 502, 504, 506, 508, 510 is a Laplacian of Gaussian second order partial derivative filter response image computed for a particular a according to the equation (1). The volume size depends on the image spatial area considered and the number of scales considered in the system. A scale here is defined as the a parameter of the blurring Gaussian filter of equation (2) used to obtain a lower resolution image or an image on a lower scale. The local maximum value within this volume identifies the spatial center and associated scale of the potential interest point, such as the interest point darkened circle in plane 504 of FIG. 5. A collection of maxima determined in contiguous 3-dimensional volumes covering the entire scale-space domain is further sorted according to their magnitudes and the strongest ones are selected as a set of potential interest points. Subsequently, each potential interest point is subjected to a stability test which identifies, and rejects, those interest points lying along straight edges of image objects. The stability test is performed because interest points along straight edges are generally less stable with respect to repeatability across multiple video frames in the time domain. An example of a stability test that may be used is the Harris measure. The Harris measure $\mu(z, \sigma I, \sigma D)$ is drawn from a second moment matrix computed at spatial point z=(x, y) as in equation (4):

$$\mu(z, \sigma I, \sigma D) = \sigma^2 Dg(\sigma I) * \begin{bmatrix} \Sigma L_x^2(z, \sigma D) & \Sigma L_x L_y(z, \sigma D) \\ \Sigma L_y L_x(z, \sigma D) & \Sigma L_y^2(z, \sigma D) \end{bmatrix}, \quad (4)$$

where $$L_x(z, \sigma) = \frac{\partial g(z, \sigma)}{\partial x} * I(z) \quad (5)$$

$$L_y(z, \sigma) = \frac{\partial g(z, \sigma)}{\partial y} * I(z)$$

are convolutions of image I(z) with partial derivatives of the Gaussian filter g along x and y, σI and σD are scaling parameters, and the summation is performed over a window that is linearly dependent on the scale of the particular feature point.

An interest point is rejected if the condition of equation (6) is satisfied:

$$\det(\mu) - \lambda(\text{trace}^2(\mu)) > \text{threshold}, \tag{6}$$

where the threshold and a are heuristic parameters determined by experimentally varying the parameters in a controlled setting, det(μ) signifies the determinant of μ in equation (4), and trace is the matrix trace in equation (4).

Also, one or more orientations may be determined and associated with each interest point location, where such determination is usually based on local image gradient directions. The next operations are performed on image data in the neighborhood of detected interest points, and the rest of the image frame beyond the interest regions is discarded.

A problem occurs when an image has undergone an affine transformation, so that spatial scale changes are not necessarily the same in all directions. In this case, a selected scale does not reflect a real transformation of a point. Thus, an additional error is introduced to the location of the point if detection scales do not correspond to the scale factor between corresponding image patterns. For example, in the case of affine transformations, the detection scale has to vary independently in the x and y spatial directions to account appropriately for possible affine transformation. Hence, a second processing step is used to partially resolve this problem with respect to a common set of affine distortions or transformations frequently found in digital videos.

In the second step of the two step approach, the interest point scale and position are refined based on a set of fully sampled anisotropic Gaussian filters and a Hessian matrix determinant computation. This novel anisotropic detector evaluates independently two orthogonal spatial directions in order to identify symmetric as well as elongated blob like image structures at various scales commonly introduced by changing image aspect ratio, stretching, squeezing, and rotating an image, or changing the camera point of view, or the like, or some combination thereof.

Figure 6A:
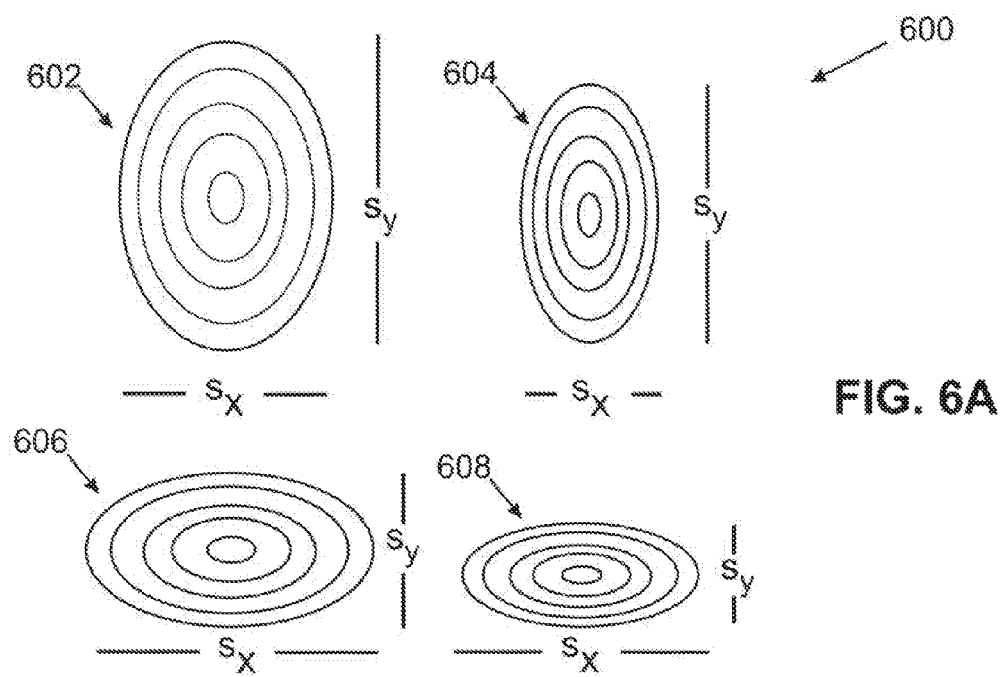
FIG. 6A illustrates anisotropic elliptic-shaped Gaussian second order derivative filters used to compute the determinant of the Hessian matrix in accordance with an embodiment of the present invention.
Figure 6B:
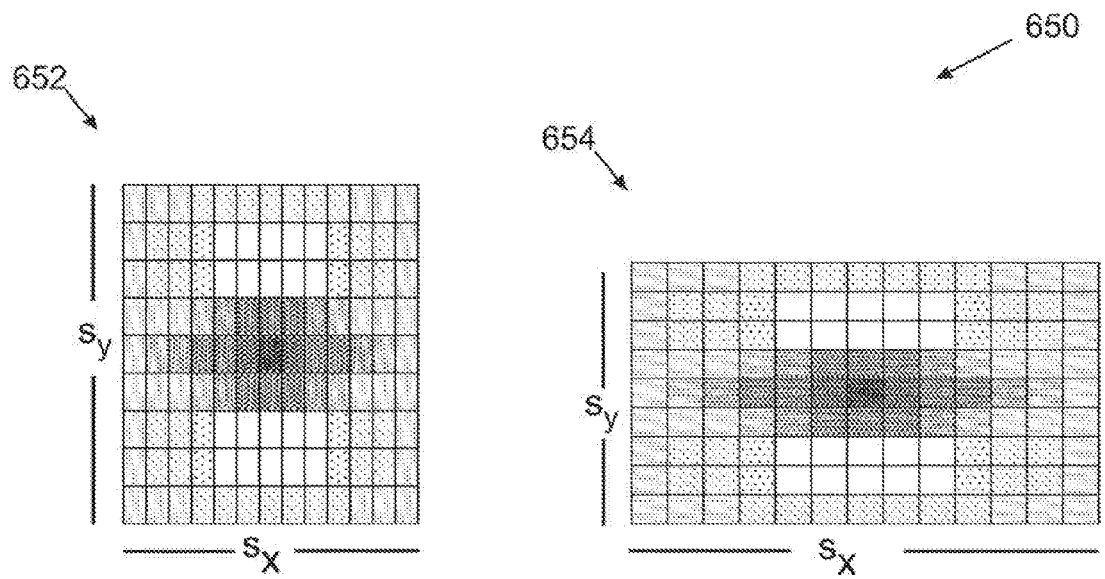
FIGS. 6B and 6C illustrate discrete approximations of the elliptic second order partial derivative Gaussian filters in the y-direction and the xy-directions, respectively, in accordance with an embodiment of the present invention.
Figure 6C:
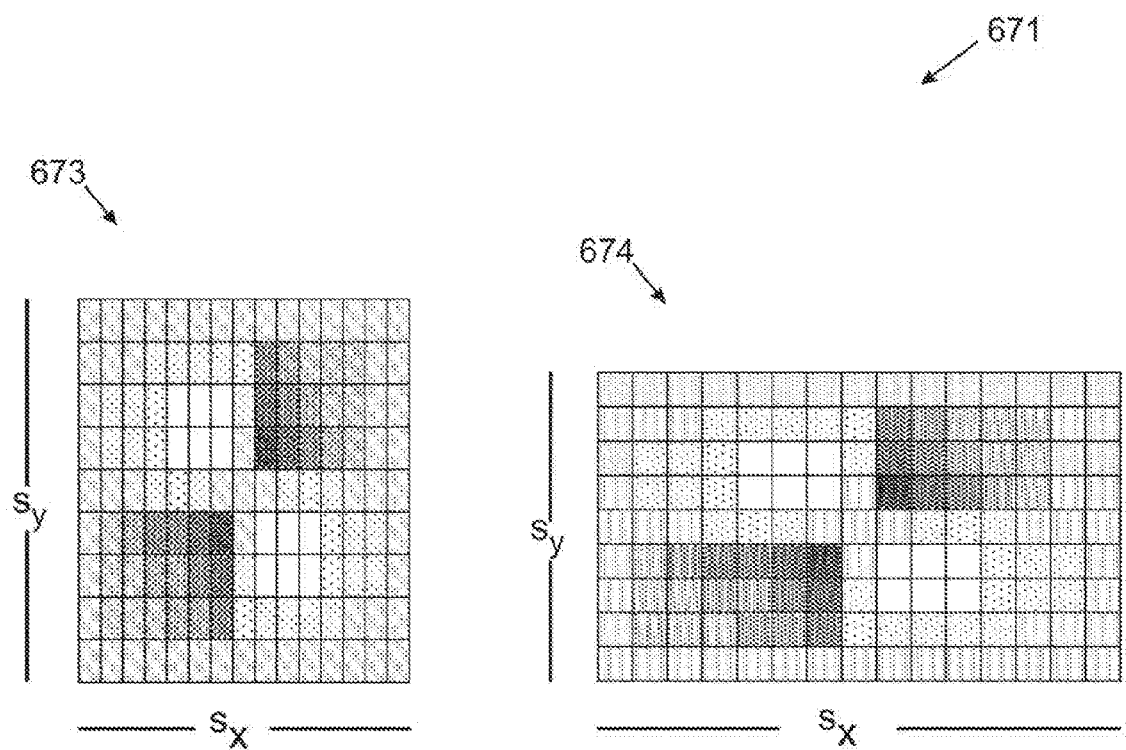

The refinement step begins by applying an array of elliptic-shaped, anisotropic Gaussian second order partial derivative filters for the interest point detection, FIG. 6A, instead of circular shaped, symmetric Gaussian second order partial derivative filters. The elliptic-shaped Gaussian second order partial derivative filters, with major and minor axes of $s_x$ and $s_y$, 602, 604, 606, 608, allow for a descriptor, created for each previously identified interest point, to take directly into account a shape of an interest point's surrounding pixel structure reflected by its ($s_x$, $s_y$) scale. The ($s_x$, $s_y$) scale parameters define spatial extent of the elliptic-shaped anisotropic filters, and are directly proportional to the ($\sigma_x$, $\sigma_y$) blurring parameters of the Gaussian filter of equation (7) below. Hence, the interest point descriptor is generated in a rectangular region around an identified interest point with rectangle vertices made directly proportional to the ($s_x$, $s_y$) scale. This rectangular region, used for interest point descriptor generation, is advantageous in deriving more precisely matching signatures under various image distortion conditions, as described in more detail below.

The two dimensional anisotropic Gaussian kernels are given by:

$$g(x, y, \sigma_x, \sigma_y) = \frac{1}{2\pi\sigma_x\sigma_y} e^{-(x^2+y^2)/2\sigma_x\sigma_y}, \tag{7}$$

where distinct pairs of $\sigma_x$, $\sigma_y$ parameters are directly proportional to the $s_x$, $s_y$ scale parameters used to construct discretized second order partial derivative Gaussian filters as in FIG. 6A. FIGS. 6B 650 and 6C 670 present examples of discretized approximations of the elliptic second order partial derivative Gaussian filters in y-direction 652, 654, and xy-direction 672, 674, respectively. Examples of the discretized filters 652, 654, 672, and 674 have finite rectangular spatial support with rectangle sides of ($s_x$, $s_y$).

The Hessian matrix H(z, $\sigma_x$, $\sigma_y$) at spatial point z=(x, y) and scale pair $\sigma_x$, $\sigma_y$ is defined by equation (8):

$$H(z, \sigma_x, \sigma_y) = \begin{bmatrix} L_{xx}(z, \sigma_x\sigma_y) & L_{xy}(z, \sigma_x, \sigma_y) \\ L_{yx}(z, \sigma_x, \sigma_y) & L_{yy}(z, \sigma_x, \sigma_y) \end{bmatrix}, \tag{8}$$

where $$L_{xx}(z, \sigma_x, \sigma_y) = \frac{\partial^2 g(z, \sigma_x, \sigma_y)}{\partial^2 x} * I(z), \tag{9}$$

$$L_{yy}(z, \sigma_x, \sigma_y) = \frac{\partial^2 g(z, \sigma_x, \sigma_y)}{\partial^2 y} * I(z),$$

$$L_{xy}(z, \sigma_x, \sigma_y) = \frac{\partial^2 g(z, \sigma_x, \sigma_y)}{\partial x \partial y} * I(z),$$

$$L_{yx}(z, \sigma_x, \sigma_y) = \frac{\partial^2 g(z, \sigma_x, \sigma_y)}{\partial x \partial y} * I(z)$$

In the four equations (9), I(z) is the image intensity at point z, $\partial^2/\partial x^2$, $\partial^2/\partial y^2$ the second order partial derivatives, and * denotes the convolution operator.

The Hessian matrix determinant is defined as in equation (10):

$$\det(H) = L_{xx}L_{yy} - L_{xy}L_{yx}. \tag{10}$$

Interest points are located at the maxima of the Hessian determinant of equation (10) computed in suitable contiguous scale-space volumes.

Figure 7A:
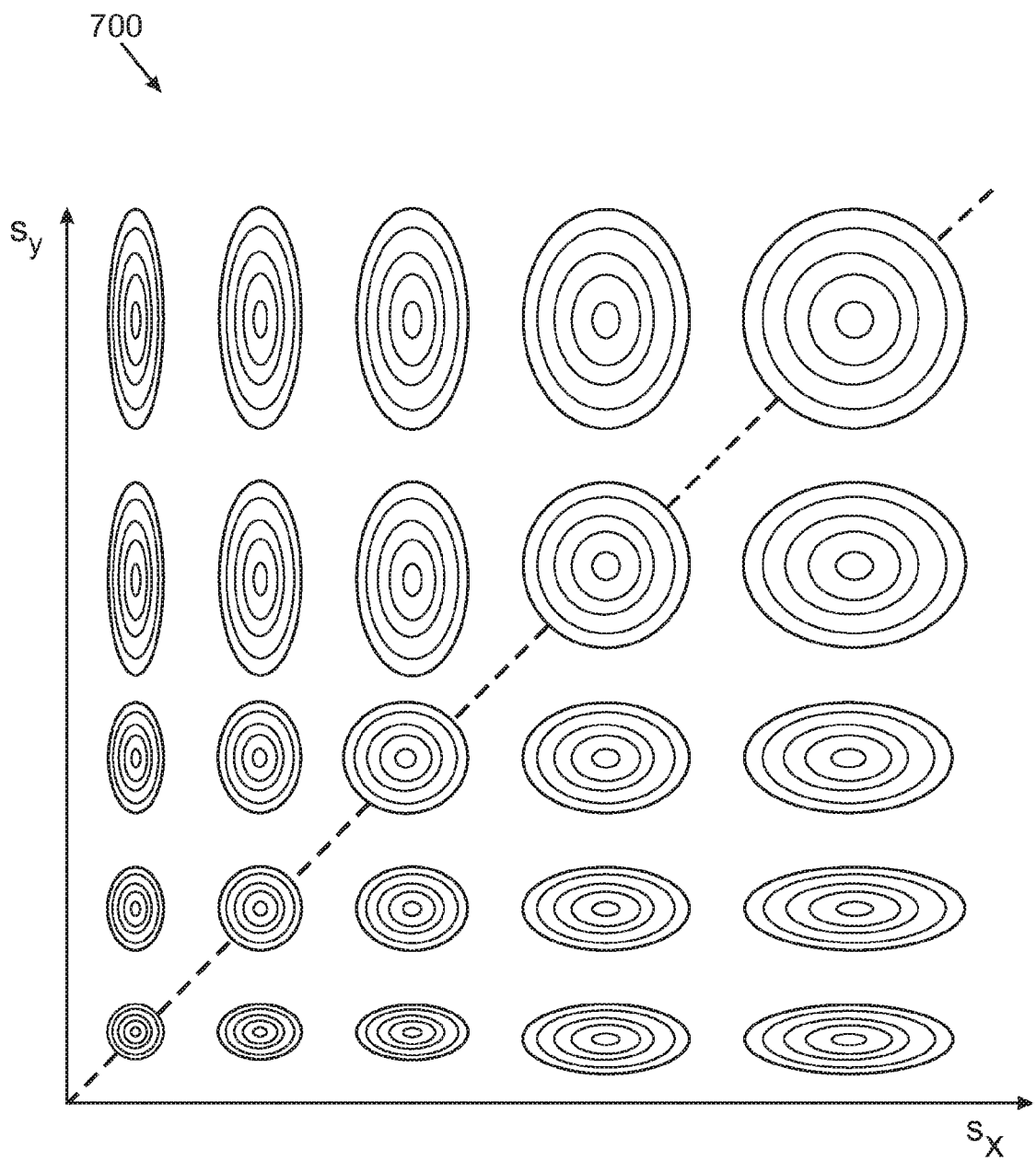
FIG. 7A illustrates an exemplary set of elliptic-shaped anisotropic Gaussian second order derivative filters in the $(s_x, s_y)$ scale domain in accordance with an embodiment of the present invention.
Figure 7B:
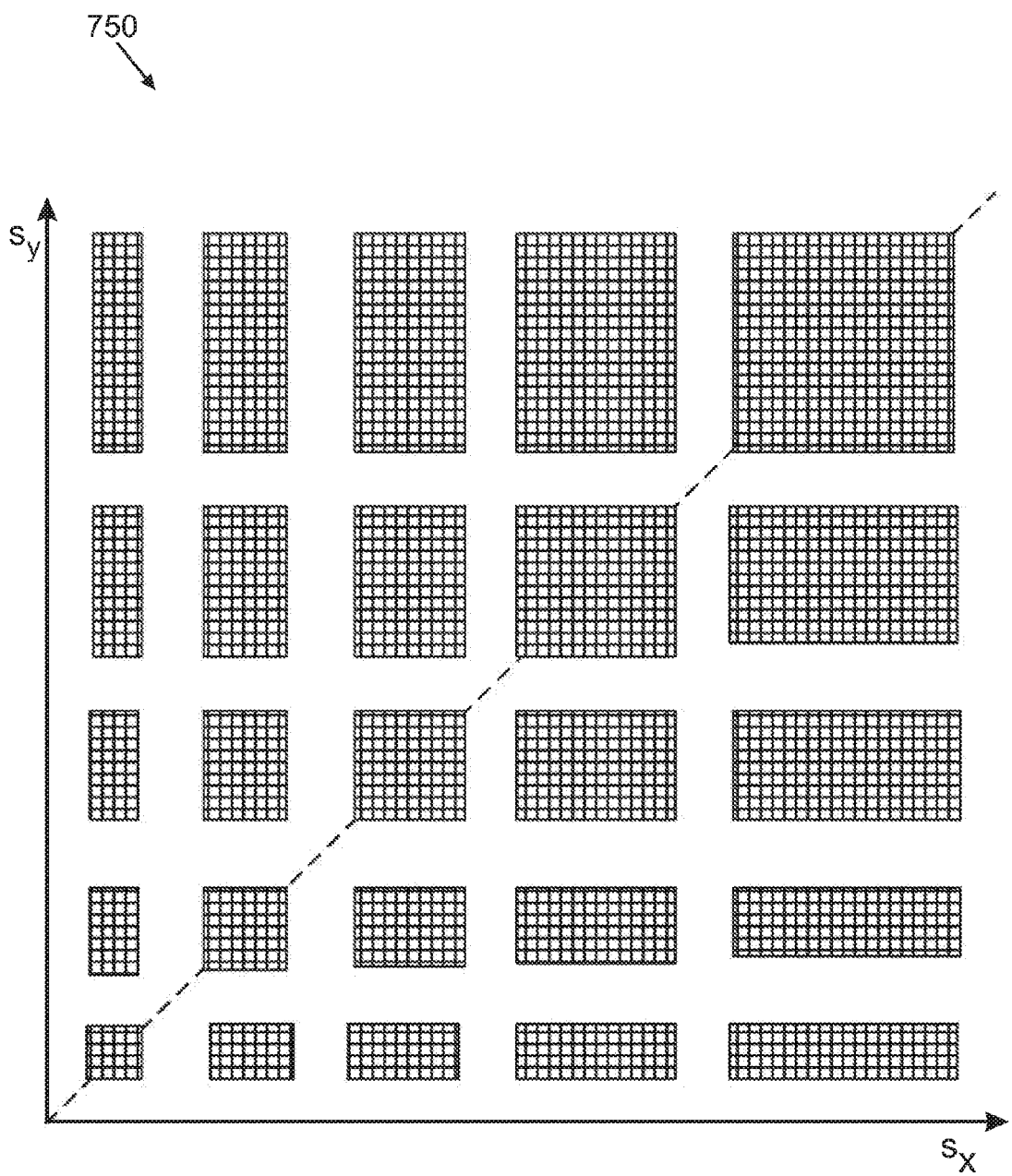
FIG. 7B illustrates discretized versions of the set of elliptic-shaped anisotropic filters of FIG. 7A in accordance with an embodiment of the present invention.

An exemplary set of 25 anisotropic second order partial derivative Gaussian filters is illustrated in FIG. 7A, with discretized versions presented in FIG. 7B. As an example, for each filter in FIG. 7B a Hessian determinant response image is constructed by computing Hessian det(H) at each image spatial point z=(x, y) and for each scale ($s_x$, $s_y$), corresponding to ($\sigma_x$, $\sigma_y$) pair in the equations (9).

FIG. 8 illustrates an example of Hessian determinant response images 800 generated at 25 ($s_x$, $s_y$) scales, of which two sets 802 and 804 are shown in the diagram. Each set 802, 804 with 5 filter response images 806, 808, 810, 812, 814 and 816, 818, 820, 822, 824 forms a three dimensional 45-pixel scale-space neighborhood in the $s_x$ direction for constant $s_y$. For example, the set 802 shows a three dimensional 45-pixel scale-space neighborhood formed in the $s_x$ direction, for constant $s_{y0}$, while set 804 shows a three dimensional 45-pixel scale-space neighborhood formed in the $s_x$ direction, for constant $s_{y4}$. The five sets of filter response images, each with 3×3 spatial extent, form a four dimensional volume in which a local maximum value will be determined. The local maximum value is determined by examining pixel magnitudes in a four dimensional volume, represented by a four tuple ($s_x$, $s_y$, x, y), at a spatial-scale neighborhood of 3×3×5×5 representing a 3×3 spatial neighborhood and a 5×5 scale neighborhood. A collection of maxima, determined in contiguous 4-dimensional volumes covering the entire scale-space domain, is further sorted according to their magnitudes, and the strongest maxima are selected as a set of non-interpolated refined interest points with associated vectors ($s_x$, $s_y$, x, y, peak polarity) describing their spatial position, scale, and the peak polarity. As an example, in FIG. 8, a maximum value or a peak 826 shown as a shaded pixel, surrounded with 224 pixels in the four dimensional volume, is detected at a 3×3 spatial position and at corresponding scale ($s_{x3}$, $s_{y0}$). This local maximum represents a potential interest point spatial position with associated scale ($s_{x3}$, $s_{y0}$). In general, the four dimensional spatial-scale volume size depends on the local spatial area considered and the total number of scales used in the system, and can be arbitrarily set to any size.

In order to further refine the scale-space maxima of the filter response images a spatial-scale domain interpolation may be deployed in the neighborhood of selected maxima by using a second order Taylor series approximation.

The second order Taylor series approximation is computed based on values in a scale-space neighborhood of each maximum value previously determined in a set of four dimensional volumes. For example, $z=(s_x, s_y, x, y)$ denotes a point in the combined scale-space domain, $z_0=(s_{x0}, s_{y0}, x_0, y_0)$ denotes a position of a peak, and $F(z)$ denotes a value of the determinant of the Hessian $\det(H)$ at position z. If $F(z)$ is suitably continuous and differentiable, then $F(z)$ may be approximated about $z_0$ as determined by equation (11):

$$F(z)=F(z_0)+(\partial F/\partial z)(z-z_0)_T+[(z-z_0)(\partial^2 F/\partial z^2)^{-1}(z-z_0)^T]/2, \quad (11)$$

where T is the transpose operation. The interpolated position of the peak is determined by equation (12):

$$z'=z_0-(\partial^2 F/\partial z^2)^{-1}(\partial F/\partial z)^T. \quad (12)$$

By substitution of z by z' in equation (11), the interpolated height of the peak is determined by equation (13):

$$F(z')=F(z_0)[(\partial F/\partial z)(\partial^2 F/\partial z^2)^{-1}(\partial F/\partial z)^T]/2, \quad (13)$$

where all derivatives are computed at $z_0$. The discrete approximations to the derivatives are computed from the values in a neighborhood about $z_0$.

The interpolation approach presented above is general and is valid for different numbers of dimensions. One or both scale values may be interpolated, or both the scale and pixel positions of a peak may be interpolated. In rare cases, when the inverse of $(\partial^2 F/\partial z^2)$ does not exist, the computed results may be unstable and produce results that are out of range. Using tests, these situations may be detected and the original un-interpolated peak location and height may be used.

In a large video data base, many video frames will have similar features making it difficult to distinguish between correct and false matches. However, for a sufficiently precise interest point detector and descriptor, correct matches can be filtered from a coarse set of matches by identifying subsets of descriptors that agree on the object, its location, scale, and orientation, thus considerably decreasing the probability that several features will agree on all parameters.

Identification of consistent feature clusters, such as features based on x, y position, $s_x$, $s_y$ scales, blob polarity, and the like, is performed by a suitable voting method, and each cluster, with a number of features is further subjected to test and verification. Image features consistent with these clusters are identified while the outliers are discarded. Multiple verification strategies may be employed with a goal to increase confidence that the initial feature pairing is correct, and the query video clip belongs to the identified reference video.

Descriptor generation and signature sampling are described next. A number of features or interest points, selected in the second processing step as described above are filtered by a set of filtering rules in order to generate a set of spatial descriptors and associated signatures. For each interest point at a spatial (x, y) position, a rectangular region is determined with the interest point in its center and with a size proportional to $s_x$, $s_y$ scales computed for that interest point.

Figure 9:
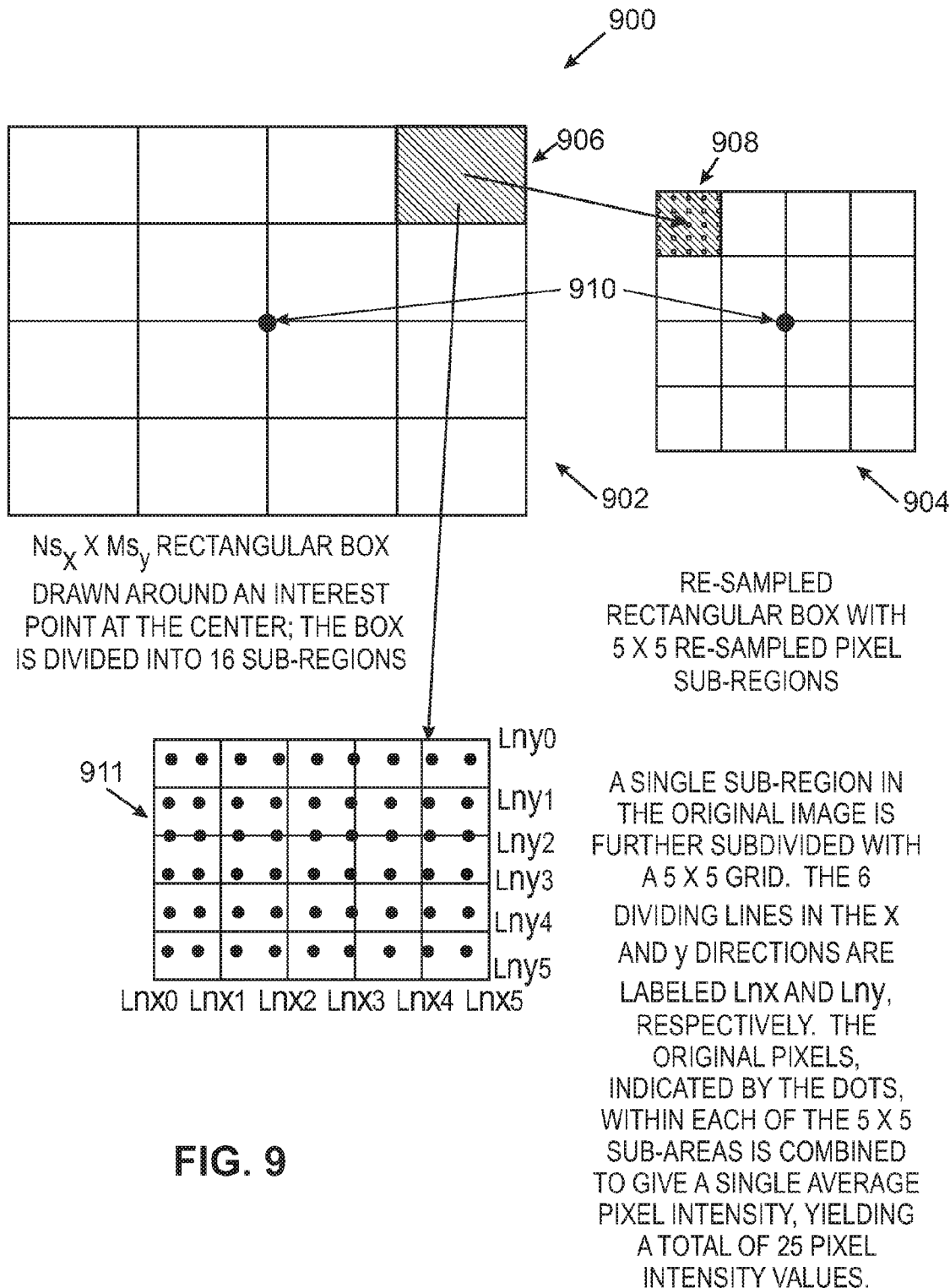
FIG. 9 illustrates an exemplary descriptor area box, centered at an interest point, with 16 sub-regions and a resampled grid with 16 5×5 pixel regions in accordance with an embodiment of the present invention.

FIG. 9 illustrates an exemplary rectangular descriptor box 902, centered at an interest point 910, with 16 sub-regions. The rectangular descriptor box 902 is resampled to generate resampled grid 904 with 16 5×5 pixel regions, such as region 908, in accordance with an embodiment of the present invention. Given feature parameters (x, y, $s_x$, $s_y$) a rectangular descriptor box 902 is placed on the image with center at (x, y) interest point 910 and with spatial extent of $Ns_x$, $Ms_y$, where N and M are multiplication factors which determine the size of the neighborhood around the interest point under consideration. This rectangular descriptor box 902 is subdivided into a 4×4 grid to create 16 blocks of pixels, and for each of the blocks, such as block 906, a 5×5 grid 911 is created. For each block, such as block 906, the 5×5 pixel grid 911 with associated 25 re-sampled pixel values 908 is computed as follows. First, lines that define the 5×5 sub-grid are determined, where these lines are given with sub-pixel accuracy and are not necessarily aligned with the pixel boundaries 911. In the x direction, the lines evenly subdivide the block 911 horizontally and are named Lnx0, Lnx1, . . . , Lnx5. Likewise, in the y direction, the lines evenly subdivide the block 911 vertically and are named Lny0, Lny1, . . . , Lny5. The locations of the pixels contained within rectangle 911 are shown as dots. The pixels contained within each of the 5×5 sub-grid areas are combined to produce a resampled pixel. This is done by summing the intensity values and dividing by the number of pixels, within each of the 5×5 sub-grid areas. Note that there may be different number of pixels for some or all of the 5×5 sub-grid areas. There may also be no pixels in a 5×5 sub-grid area, in which case the resampled intensity value is taken as zero.

This 5×5 pixel sub-region, computed for each of the 16 blocks of the rectangular box drawn around an interest point, is subsequently used to generate a descriptor and, based on this descriptor, a signature for that interest point.

Figure 10:
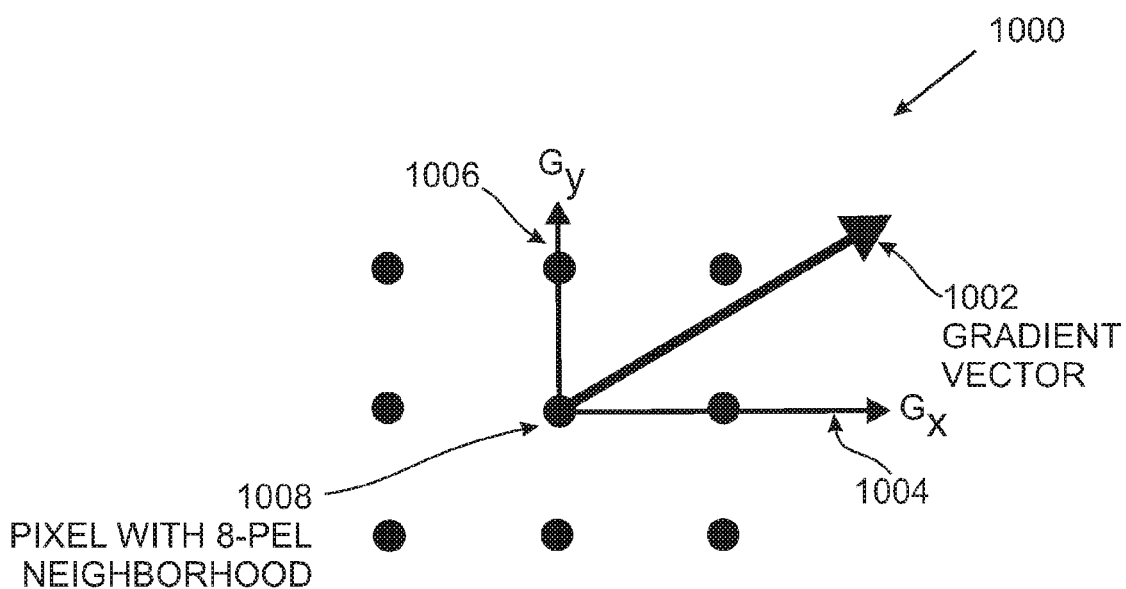
FIG. 10 illustrates a spatial gradient vector computed in pixel eight-neighborhood in accordance with an embodiment of the present invention.

The descriptor and signature generation is based on a method of computing the pixel intensity gradient vector, for each pixel in a 5×5 resampled region. FIG. 10 shows an exemplary pixel intensity gradient vector graph 1000 with a 3×3 grid pixel f(x,y) 1008 at position (x,y) and its 8-pixel neighborhood. A gradient vector [G(x) G(y)] 1002, with its horizontal and vertical components $G_x$ 1004 and $G_y$ 1006, is computed for the pixel 1006 with intensity f(x,y) as a partial derivative in the image x and y spatial directions as determined by equation 14:

$$[G_x(x), G_y(y)]=[\partial f(x,y)/\partial x, \partial f(x,y)/\partial y]. \quad (14)$$

Figure 11:
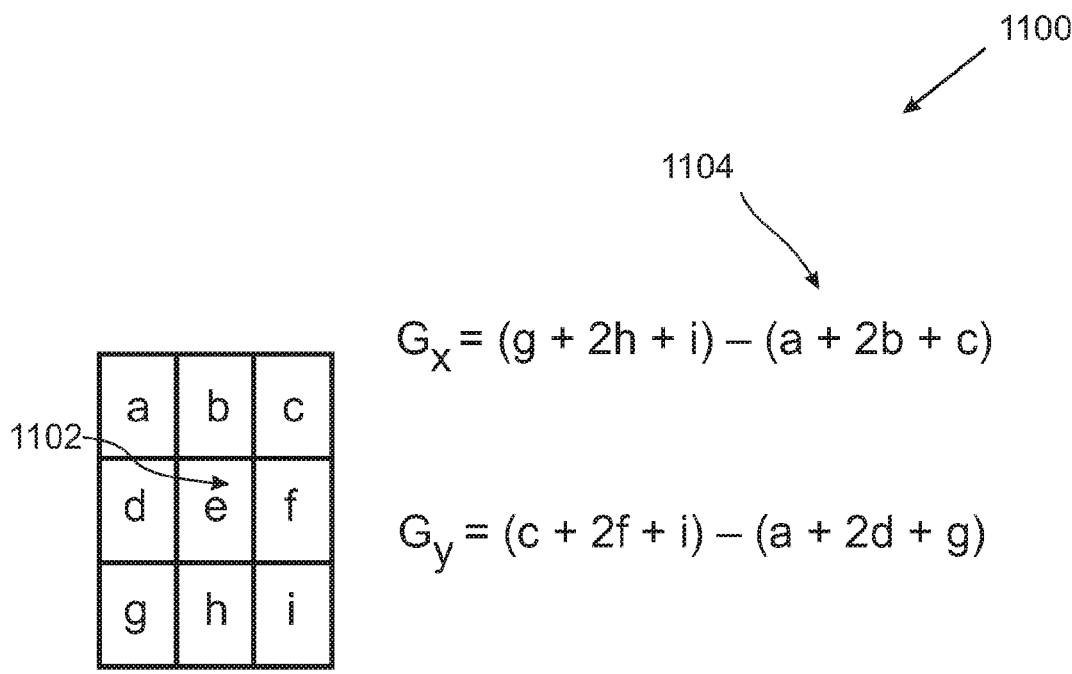
FIG. 11 illustrates pixel area and equations for the spatial gradient vector approximation based on the pixel intensity values in the eight-pixel neighborhood in accordance with an embodiment of the present invention.

The partial derivative computation is approximated with a $G_x$ and a $G_y$ operator 1104 presented in pixel intensity gradient approximation 1100 of FIG. 11, where the pixel f(x,y) 1006 is positioned at position 1102 of FIG. 11 which has an associated intensity e and pixel intensity values a-i are the intensity values in the surrounding 3×3 pixel area. Based on the $G_x$ and $G_y$ operators 1104, a gradient vector intensity for a single pixel may be computed by equation 15:

$$G_m=\sqrt{[G_x^2+G_y^2]}. \quad (15)$$

For each 5×5 re-sampled region, four values are computed, including a resultant gradient magnitude that is a sum $G_M$ of pixel intensity gradients $G_m$, a resultant gradient in the spatial x direction that is a sum $G_X$ of pixel $G_x$ components, a resultant gradient in the spatial y direction that is a sum $G_Y$ of pixel $G_y$ components, and a resultant sum of gradients in both x and y directions that is a sum $G_{XY}$ of combined $G_x+G_y$ values computed for each pixel, according to equations 16-19:

$$G_M = \Sigma_n G_m, \quad (16)$$

$$G_X = \Sigma_n G_x, \quad (17)$$

$$G_Y = \Sigma_n G_y, \quad (18)$$

$$G_{XY} = \Sigma_n G_{xy}. \quad (19)$$

The set of four values, equations 16-19, corresponding to each 5×5 re-sampled region, and 16 regions form a 64-dimensional descriptor/signature for the particular interest point in question.

The above description is presented by way of an example. However, the method is general with respect to the initial box size, block re-sampling grid size, and the number of dimensions drawn for the descriptor/signature generation.

Figure 12:
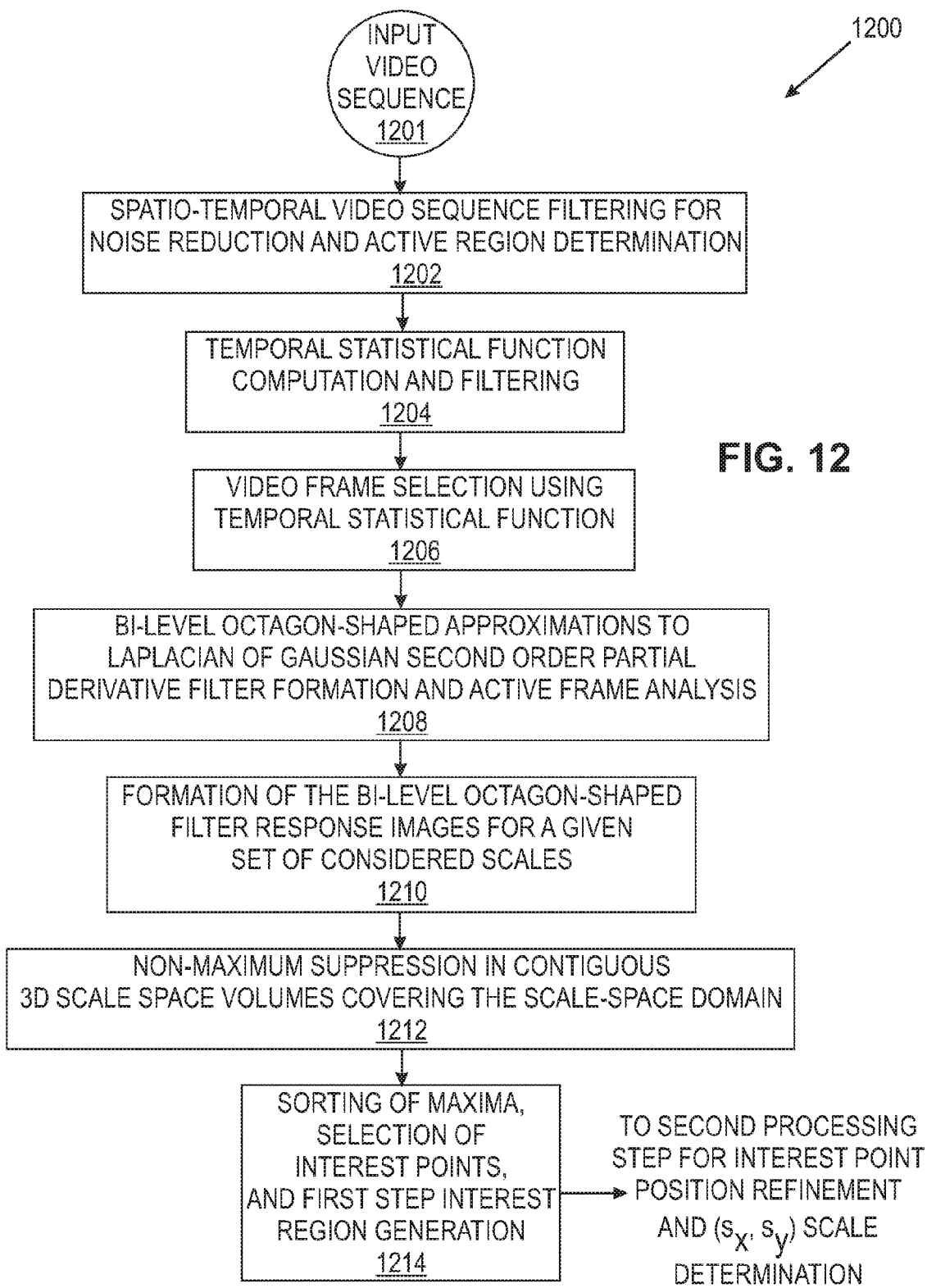
FIG. 12 illustrates a video sequence spatio-temporal pre-processing flowchart for frame selection and feature extraction as part of the process of FIG. 2 in accordance with an embodiment of the present invention.

FIG. 12 illustrates a video sequence spatio-temporal pre-processing flowchart 1200 for frame selection and feature extraction as part of the process 200 steps 208 and 210 of FIG. 2 in accordance with an embodiment of the present invention. At step 1201, an input video sequence is received. At step 1202, the video sequence is processed by spatio-temporal video sequence filtering for noise reduction and active region determination. In particular, the video sequence is filtered by a spatial Gaussian filter for noise reduction before it is further processed for active region determination and frame selection in steps 1204 and 1206. At step 1204, spatial statistical parameters are computed for the full frame, and based on these statistical parameters, a temporal statistical function f(n) is computed, where n=0, 1, 2, . . . , k and k is the number of frames in the video sequence. The temporal statistical function f(n) is filtered by a median filter in step 1204 and passed to step 1206.

Next, video frames are selected in step 1206 based on the analysis of the shape of the temporal statistical functions f(n), output of step 1204. At step 1208, bi-level octagon shaped or star shaped approximations to Laplacian of Gaussian second order partial derivative filters are formed and frame analysis is activated on the selected frames. At step 1210, bi-level octagon shaped or star shaped filter response images are formed for a desired set of scales. The set of filter response images from step 1210 are further processed in step 1212 by performing a non maximum suppression in three dimensional scale-space volume, according to the equation (1), to determine a local maximum in each three dimensional volume associated with every pixel in the space of the response images.

Figure 13:
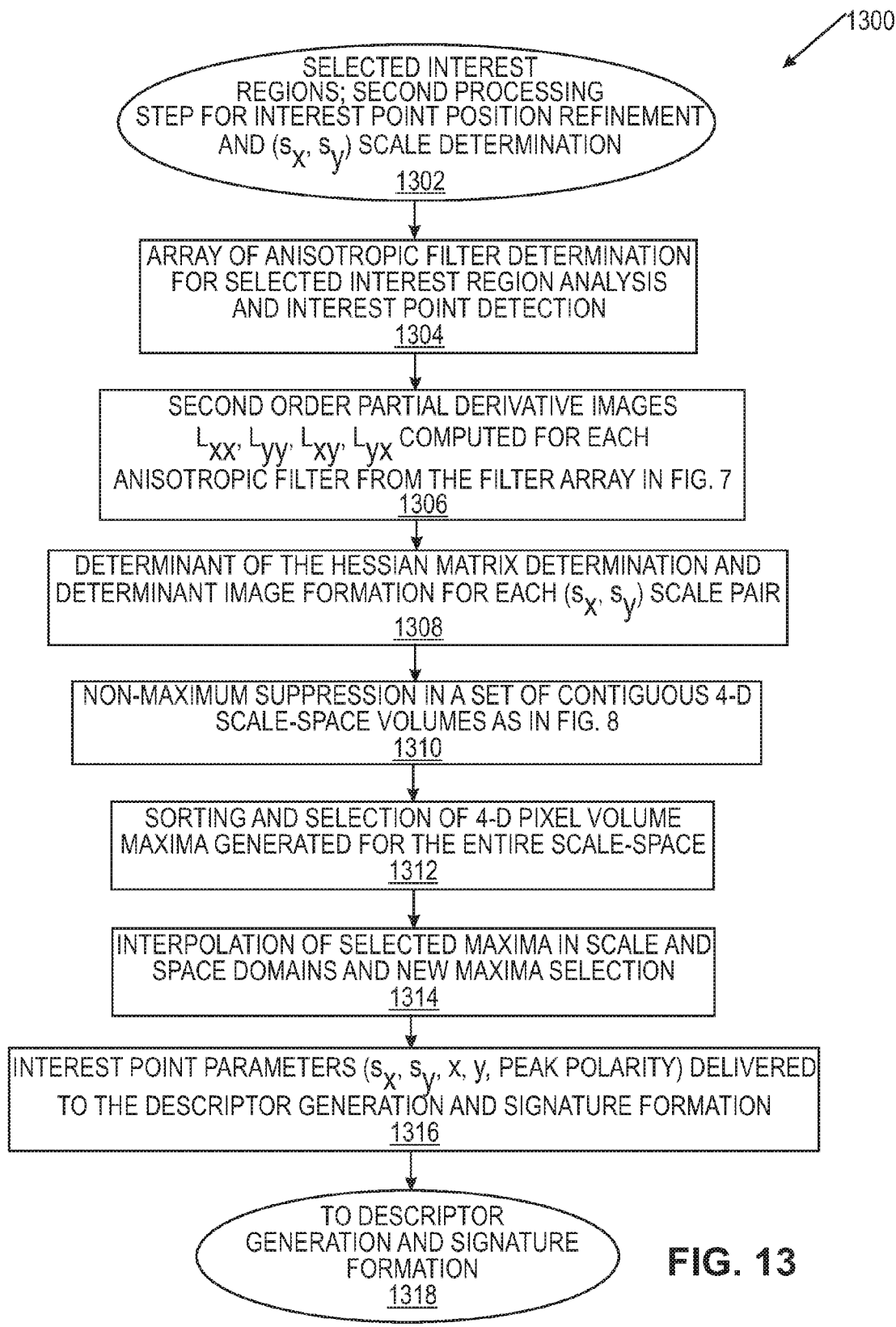
FIG. 13 illustrates a second processing step flowchart for interest point position refinement and $(s_x, s_y)$ scale determination in selected interest regions as a part of the process of FIG. 2 in accordance with an embodiment of the present invention.

In step 1214, maxima determined in step 1212 are further sorted according to their magnitudes and a subset with highest magnitude is selected to form interest regions for a second processing pass as illustrated in flowchart 1300 of FIG. 13 for interest point refinement and $(s_x, s_y)$ scale determination.

FIG. 13 illustrates a second processing step flowchart 1300 for interest point position refinement and $(s_x, s_y)$ scale determination in selected interest regions as a part of the process of step 212 of FIG. 2 in accordance with an embodiment of the present invention. In step 1304, an array of anisotropic filters is determined to analyze selected interest regions. In step 1306, second order partial derivative images $L_{xx}, L_{yy}, L_{xy}, L_{yx}$ are computed for each anisotropic filter from the filter array in FIG. 7. Next, in step 1308, a determinant of the Hessian matrix is computed and determinant images are formed for each $(s_x, s_y)$ scale. These determinant images are passed to step 1310, where non-maximum pixel suppression is performed for a set of contiguous 4-dimensional volumes constructed as illustrated in FIG. 8 for the entire scale-space domain. The determinant image spatial frame is tiled into 3×3 spatial regions, and local maxima are computed for each group of pixels in a 4-dimensional volume bounded by a 3×3 spatial region and all considered scales. In step 1312, a collection of local maxima is further sorted according to their magnitudes, and the strongest maxima are selected as a set of refined interest points with associated vectors $(s_x, s_y, x, y, \text{peak-polarity})$ describing their spatial position, scale, and the peak polarity. Selected maxima $(s_x, s_y, x, y, \text{peak-polarity})$ are further interpolated in both scale and image space and new maxima are selected in step 1314. Finally, in step 1316, interest point parameter vectors with $(s_x, s_y, x, y, \text{peak polarity})$ components are delivered via connector 1318 to the descriptor generation and signature formation process 1400.

Figure 14:
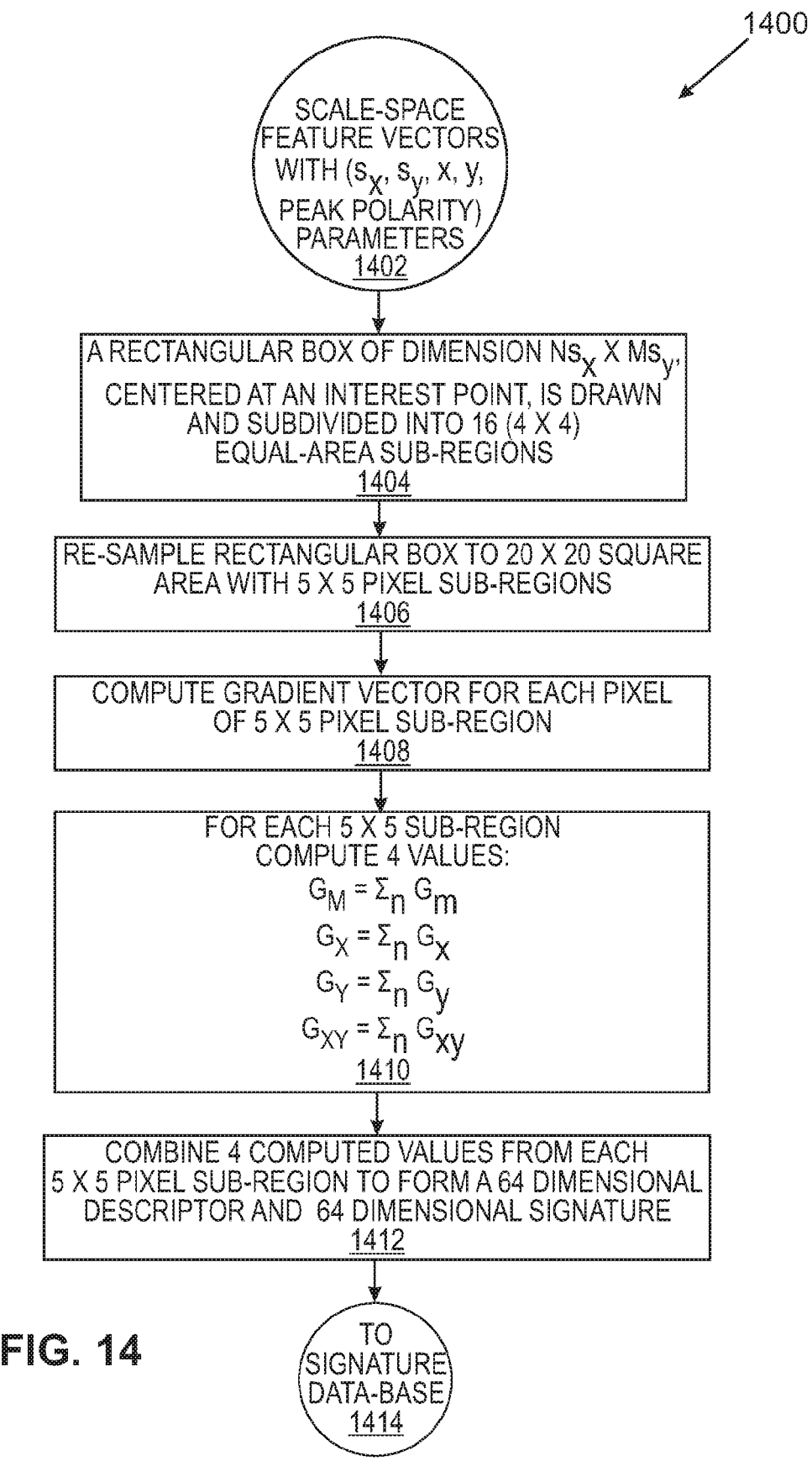
FIG. 14 illustrates a descriptor generation and signature formation process as part of the process of FIG. 2 in accordance with an embodiment of the present invention.

FIG. 14 illustrates a descriptor generation and signature formation process 1400 as part of step 214 of FIG. 2 in accordance with an embodiment of the present invention. At step 1402, the scale space feature vectors are received from the connector 1316, each containing a set $(s_x, s_y, x, y, \text{peak polarity})$ parameters. In step 1404, a rectangular box of dimension $Ns_x \times Ms_y$, centered at an interest point, is drawn and subdivided into 16 (4×4) equal area sub-regions. Next, in step 1406, each interest point rectangular box is re-sampled to a 20×20 square area consisting of 16 5×5 pixel sub-regions. In step 1408, a gradient vector for each pixel of the 16 5×5 pixel sub-regions is computed. Next, in step 1410, for each 5×5 sub-region a resultant gradient magnitude $G_M$, resultant gradient in spatial x direction $G_X$, resultant gradient in spatial y direction $G_Y$, and resultant sum of gradients in both x and y directions $G_{XY}$ are computed. At step 1412, these four values, computed for each of the 16 5×5 sub-regions, form a 64-dimensional descriptor. The 64-dimensional descriptor is further used to derive a 64-dimensional signature with a reduced number of bits per dimension. A collection of 64-dimensional signatures from each interest region and each selected frame of a video sequence constitute a compact representation of the video sequence.

Figure 15:
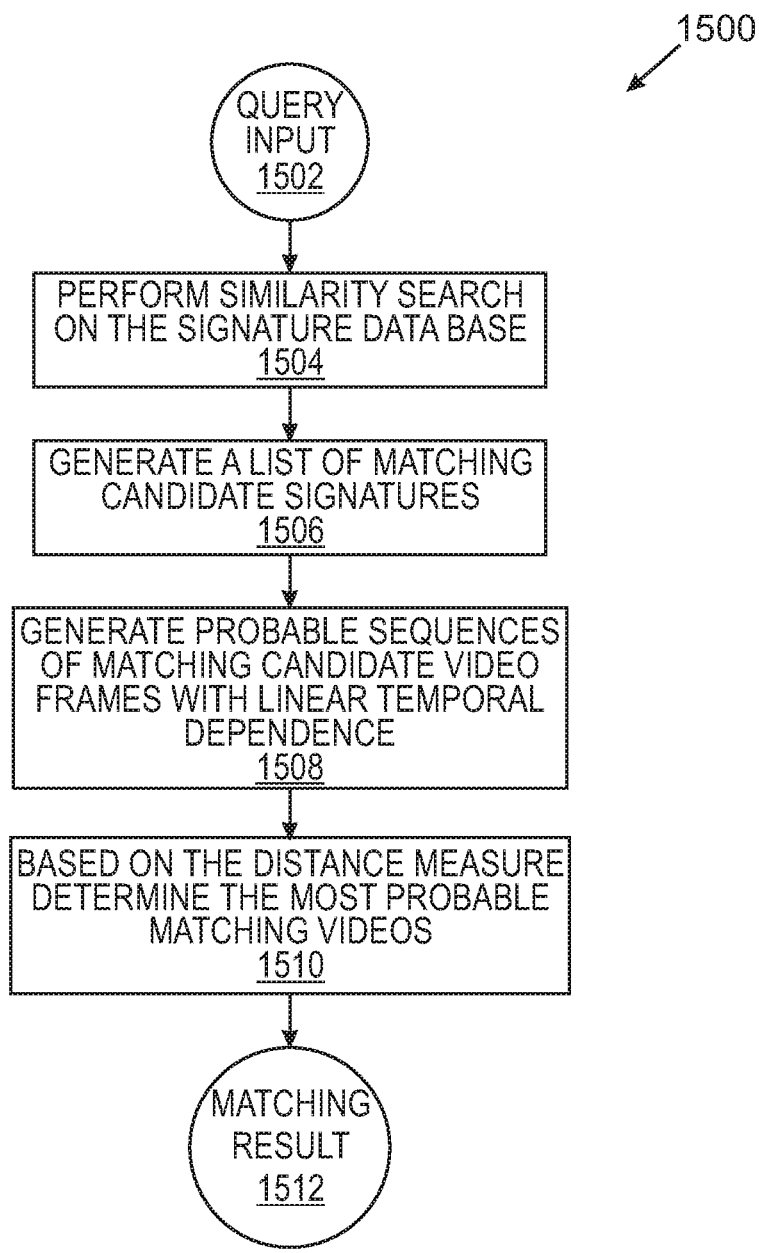
FIG. 15 illustrates a signature database query and matching video sequence determination process as part of the process of FIG. 2 in accordance with an embodiment of the present invention.

FIG. 15 illustrates a signature database query and matching video sequence determination process 1500 as part of step 216 of FIG. 2 in accordance with an embodiment of the present invention. At step 1502, a set of signatures representing a query video sequence is received. At step 1504, a multidimensional similarity search is performed with each query signature to determine a set of matching signatures in the video database which are in the neighborhood of the query. At step 1506, a list of matching candidate signatures is generated. At step 1508, probable sequences of matching candidates with linear temporal dependence are generated. At step 1510, the most probable matching video sequence is determined based on a set of distance measures. At step 1512, based on a distance measure, the most probable matching video sequence is determined and presented as a search result.

The method presented here describes in detail a digital image interest point detector and an interest region descriptor which are based on an array of anisotropic Gaussian filters and a two stage interest point determination process. The interest point detector provides an accurate description of pixel formations in the neighborhood of an interest point in the presence of geometric and optical distortions by allowing for the descriptor region to be automatically adapted to affine transformations in orthogonal spatial directions. In addition, through a two pass analysis interest region determination process, performance is improved by reducing the effective area of an image which needs to be processed in the second step of interest point (x,y) coordinate refinement and affine scale determination. The method allows for robust and precise extraction of image features resistant to image scale change, aspect ratio change, camera viewpoint change, illumination and contrast change, thus lending itself to accurate digital video fingerprinting.

Those of skill in the art will appreciate from the present disclosure additional alternative systems and methods for a scalable identification of digital video sequences in accordance with the disclosed principles of the present invention. Thus, while particular embodiments and applications of the present invention have been illustrated and described, it is to be understood that the invention is not limited to the precise construction and components disclosed herein and that various modifications, changes and variations which will be apparent to those of ordinary skill in the art may be made in the arrangement, operation and details of the method and apparatus of the present invention disclosed herein without departing from the spirit and scope of the invention as defined in the appended claims.

We claim:

1. A method of image scale-space analysis that applies an array of anisotropic filters for interest region determination, the method comprising:

forming an array of elliptic-shaped anisotropic second order partial derivative Gaussian filters with a first scale parameter in the x direction ($s_x$) and a second scale parameter in the y direction ($s_y$) as scale parameters ($s_x$, $s_y$);

forming an array of rectangular-shaped anisotropic second order partial derivative Gaussian filters with finite spatial support according to the ($s_x$, $s_y$) scale parameters to approximate the elliptic-shaped anisotropic second order partial derivative Gaussian filters;

analyzing scale space for a selected image frame by the array of rectangular-shaped anisotropic second order partial derivative Gaussian filters of finite spatial support to determine at least one interest point corresponding to different ($s_x$, $s_y$) scale parameters, wherein an interest point identifies a location of a distinct image region in the selected image frame; and convolving a region of pixels in a surrounding neighborhood of the determined at least one interest point with the array of rectangular anisotropic second order partial derivative Gaussian filters to produce at least one interest point result that is resistant to image distortion.

2. The method of claim 1 further comprising:

computing a Hessian determinant and a Hessian determinant response image for each anisotropic second order partial derivative Gaussian filter with scale parameters ($s_x$, $s_y$).

3. The method of claim 2 further comprising:

determining a set of local maxima in contiguous 4-dimensional scale-space volumes of Hessian determinant response images, wherein the set of local maxima is further sorted in magnitude and a new set of local maxima is selected that represents a set of non-interpolated interest points.

4. The method of claim 2 further comprising:

interpolating a set of local maxima in a combined spatial-scale 4-dimensional pixel volume of Hessian determinant response images, constructed for a j by j spatial neighborhood and a k by k scale neighborhood of each Hessian determinant response image, to produce a spatial position and ($s_x$, $s_y$) scale parameters of at least one refined interest point.

5. The method of claim 4, wherein the at least one refined interest point is described with a 5-tuple ($s_x$, $s_y$, x, y, peak polarity).

6. The method of claim 1, wherein the scale parameters ($s_x$, $s_y$) are directly proportional to blurring parameters ($\sigma_x$, $\sigma_y$) used in said Gaussian filters.

7. The method of claim 1, wherein the at least one interest point result includes a location coordinate x, y and scale parameters $s_x$, $s_y$ for the determined at least one interest point.

8. The method of claim 1 further comprising:

establishing a rectangular array of pixels centered at the determined at least one interest point in the selected image frame and sub-divided into equal sized pixel arrays, wherein each pixel array is comprised of re-sampled pixels;

computing gradient functions for each pixel array, wherein each computed gradient function produces a multi-bit value representing a dimension of the rectangular array; and combining the produced multi-bit values for each pixel array to form a multi-dimensional descriptor.

9. The method of claim 8, wherein the rectangular array is sized in proportion to the ($s_x$, $s_y$) scale parameters.

10. The method of claim 8 further comprising:

reducing the number of bits per dimension in each gradient multi-bit value to form a multi-dimensional signature, wherein the formed multi-dimensional signature is a compact representation of the determined at least one interest point.

11. A method of image scale-space analysis that applies an array of anisotropic filters for interest region determination, the method comprising:

forming a filter array comprised of elliptic-shaped anisotropic second order partial derivative Gaussian filters with scale parameters ($s_x$, $s_y$), $s_x$ a scale parameter in the x direction and $s_y$ a scale parameter in the y direction;

applying each elliptic-shaped anisotropic second order partial derivative Gaussian filter of the filter array to an image frame to generate second order partial derivative images;

computing a determinant of a Hessian matrix of the second order partial derivative images at selected interest points with associated ($s_x$, $s_y$) scale parameters to form determinant images, wherein an interest point identifies a location of a distinct image region in the image frame; and selecting a set of local maxima interest points with associated vectors ($s_x$, $s_y$, x, y, peak value) from the determinant images for signature generation, wherein the selected set of local maxima interest points are resistant to image distortion.

12. The method of claim 11 further comprising:

computing local maxima values for groups of pixels selected from the determinant images tiled into a four dimensional volume comprising k by k spatial neighborhoods and an $s_x$ by $s_y$ scale neighborhoods for the associated ($s_x$, $s_y$) scale parameters.

13. The method of claim 12 further comprising:
sorting the computed local maxima values according to their magnitudes and selecting local maxima values that exceed a threshold as a set of refined interest points.

14. The method of claim 13 further comprising:
computing a second order Taylor series approximation based on values in a scale-space neighborhood of each refined interest point to determine the set of local maxima interest points.

15. The method of claim 11, wherein the filter array of elliptic-shaped anisotropic second order partial derivative Gaussian filters is formed across a spectrum of $s_x$ values and $s_y$ values, with filters having the same $s_x$ and $s_y$ values are isotropic.

16. The method of claim 11, wherein the second order partial derivative images are computed by a convolution of an image interest point with a second order partial derivative of a spatial point and scale pair $(\sigma_x, \sigma_y)$ used in said Gaussian filters.

17. The method of claim 16, wherein the scale parameters $(s_x, s_y)$ are directly proportional to the scale pair $(\sigma_x, \sigma_y)$.

18. The method of claim 11, wherein the signature generation comprises:
generating a multi-dimensional descriptor in a rectangular region of pixels centered on an interest point selected from the set of local maxima interest points, the rectangular region having a spatial extent proportional to the $s_x$ scale parameter and the $s_y$ scale parameter and partitioned into sub-regions representing dimensions of the descriptor;
computing gradient functions for each sub-region providing multiple bit results per dimension of the multi-dimensional descriptor; and
generating a signature from the multi-dimensional descriptor by reducing the number of bits pre dimension, wherein the generated signature is a compact representation of the selected interest point.

19. A non-transitory computer readable medium storing a computer program which causes a computer system to perform a method of image scale-space analysis that applies an array of anisotropic filters for interest region determination, the method comprising:

forming an array of elliptic-shaped anisotropic second order partial derivative Gaussian filters with a first scale parameter in the x direction ($s_x$) and a second scale parameter in the y direction ($s_y$) as scale parameters ($s_x$, $s_y$);

forming an array of rectangular-shaped anisotropic second order partial derivative Gaussian filters with finite spatial support according to the ($s_x$, $s_y$) scale parameters to approximate the elliptic-shaped anisotropic second order partial derivative Gaussian filters;

analyzing scale space for a selected image frame by the array of rectangular-shaped anisotropic second order partial derivative Gaussian filters of finite spatial support to determine at least one interest point corresponding to different ($s_x$, $s_y$) scale parameters, wherein an interest point identifies a location of a distinct image region in the selected image frame; and convolving a region of pixels in a surrounding neighborhood of the determined at least one interest point with the array of rectangular anisotropic second order partial derivative Gaussian filters to produce at least one interest point result that is resistant to image distortion.

20. The non-transitory computer readable medium of claim 19 further comprising:

applying bi-level filters of various spatial support on the selected image frame to produce multiple filter response images with the same spatial support as an original image frame;

constructing a set of contiguous rectangular spatial areas on filter response images derived for the selected image frame;

constructing a corresponding set of 3-dimensional scale-space pixel volumes for each of the contiguous rectangular spatial areas; and determining a set of local filter response maxima at spatial-scale 3-dimensional pixel volumes, wherein the set of local filter response maxima with their spatial (x, y) coordinates represents initial interest points of a first pass of selected image frame analysis.

* * * * *